US 9,073,467 B2

(12) United States Patent
Awata et al.

(10) Patent No.: US 9,073,467 B2
(45) Date of Patent: Jul. 7, 2015

(54) VEHICLE SEAT AND SEAT BACK BOARD

(75) Inventors: Shinji Awata, Togo-chou (JP); Hideki Kobayashi, Miyoshi (JP); Hisaya Mori, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 22 days.

(21) Appl. No.: 13/816,033

(22) PCT Filed: Jul. 29, 2011

(86) PCT No.: PCT/JP2011/067911
§ 371 (c)(1),
(2), (4) Date: Feb. 8, 2013

(87) PCT Pub. No.: WO2012/020697
PCT Pub. Date: Feb. 16, 2012

(65) Prior Publication Data
US 2013/0134749 A1    May 30, 2013

(30) Foreign Application Priority Data

Aug. 10, 2010  (JP) ................................ 2010-179871
Sep. 27, 2010  (JP) ................................ 2010-216011

(51) Int. Cl.
| B60N 2/42 | (2006.01) |
| B60N 2/64 | (2006.01) |
| B60N 2/58 | (2006.01) |
| B60N 2/66 | (2006.01) |
| B60N 2/68 | (2006.01) |
| B60N 2/70 | (2006.01) |
| B60N 2/72 | (2006.01) |
| B60N 2/427 | (2006.01) |

(52) U.S. Cl.
CPC ................. *B60N 2/64* (2013.01); *B60N 2/5825* (2013.01); *B60N 2/66* (2013.01); *B60N 2/68* (2013.01); *B60N 2/7094* (2013.01); *B60N 2/72* (2013.01); *B60N 2/427* (2013.01)

(58) Field of Classification Search
CPC .. B60N 2/4214; B60N 2/4221; B60N 2/4228; B60N 2/427; B60N 2/5825; B60N 2/64; B60N 2/66; B60N 2/68; B60N 2/7094; B60N 2/72
USPC ............................ 297/216.13, 216.14, 284.4
See application file for complete search history.

(56) References Cited

U.S. PATENT DOCUMENTS 5,022,709 A * 6/1991 Marchino ................ 297/452.24
5,054,845 A   10/1991 Vogel
(Continued)

FOREIGN PATENT DOCUMENTS

CN    1951720 A     4/2007
EP    0 443 057 A1  8/1991
(Continued)

*Primary Examiner* — Philip Gabler
(74) *Attorney, Agent, or Firm* — Oliff PLC

(57) ABSTRACT

A vehicle seat includes a seat back frame that has a pair of side frames, and that forms a skeleton member of a seat back, a back board portion that is formed by a resin plate, and that is disposed at a back side of the seat back frame, and a back spring section that is at least partially formed of resin, and that is integral with the back board portion, and that spans between the pair of side frames so as to be directly supported, and that is formed so as to be able to flexurally deform in a load application direction due to load toward a seat back rear side being applied.

17 Claims, 13 Drawing Sheets

(56) References Cited

U.S. PATENT DOCUMENTS

| | | | |
|---|---|---|---|
| 5,452,868 A * | 9/1995 | Kanigowski | 244/122 R |
| 6,786,544 B1 * | 9/2004 | Muraishi | 297/216.14 |
| 6,837,541 B2 * | 1/2005 | Farquhar et al. | 297/216.13 |
| 7,222,915 B2 * | 5/2007 | Philippot et al. | 297/216.13 |
| 7,543,892 B2 * | 6/2009 | Minakawa et al. | 297/452.18 |
| 7,665,805 B2 * | 2/2010 | Ueda | 297/301.6 |
| 2004/0183356 A1 | 9/2004 | Philippot et al. | |
| 2007/0085390 A1 | 4/2007 | Kawashima et al. | |
| 2007/0228789 A1 | 10/2007 | McMillen | |
| 2008/0185884 A1 * | 8/2008 | Hansen | 297/216.13 |

FOREIGN PATENT DOCUMENTS

| | | |
|---|---|---|
| EP | 1785066 A1 | 5/2007 |
| JP | U-2-76938 | 6/1990 |
| JP | U-5-55945 | 7/1993 |
| JP | A-7-291005 | 11/1995 |
| JP | A-8-308675 | 11/1996 |
| JP | A-2002-87129 | 3/2002 |
| JP | A-2004-16710 | 1/2004 |
| JP | A-2004-138156 | 5/2004 |
| JP | A-2004-322881 | 11/2004 |
| JP | A-2010-142530 | 7/2010 |

* cited by examiner

VEHICLE SEAT AND SEAT BACK BOARD

CROSS-REFERENCE TO RELATED APPLICATIONS

This application is based on and claims priority under 35 USC 119 from Japanese Patent Applications No. 2010-179871 filed on Aug. 10, 2010, and No. 2010-216011 filed on Sep. 27, 2010, the disclosures of which are incorporated by reference herein.

BACKGROUND

1. Technical Field

The present invention relates to a vehicle seat and a seat back board.

2. Related Art

Vehicle seats are disclosed in Japanese Patent Application Laid-Open (JP-A) No. 2004-138156, Japanese Utility Model Application Laid-Open No. 05-055945, and JP-A No. 08-308675. In particular, a vehicle seat that uses seat back springs formed of resin is disclosed in JP-A No. 2004-138156. To describe briefly, a seat back frame is formed in an inverse U shape in front view. Plural hook portions are welded at predetermined intervals in the seat height direction to the respective inner side surfaces of left and right side frames. Further, resin springs, that are formed in substantially rectangular plate shapes in front view, are anchored on the hook portions of the left and right side frames. By replacing conventional seat back springs with resin springs in this way, a lightening of the weight of and a reduction in the cost of the seat parts is devised.

However, because a vehicle seat is structured by numerous parts, further lightening of the weight and reduction in costs is desirable.

Further, JP-A No. 7-291005 discloses a technique of causing seat back springs, that are structured by S springs to span between a pair of left and right side frames of a seat back frame, and connecting the both ends of the seat back springs and the side frames by connecting members that can extend and contract in the vehicle longitudinal (front-rear) direction. The connecting members are structured such that, when load of a predetermined value or greater is applied, the connecting members extend toward the seat back rear side.

In accordance with the above-described structure, when, at the time of a rear collision, the passenger is pushed against the seat back and a load of a predetermined value or greater is applied to the connecting members, the connecting members extend toward the seat back rear side. As a result, the posture of the passenger is maintained, the upper body of the passenger moves toward the seat back upper side, the head becoming offset from the head rest supporting position is suppressed, and this structure thereby attempts to reduce the load to the neck of the passenger.

However, in the above-described structure, since each of the both ends of the seat back springs, that are disposed in plural stages, and the side frames are connected by one connecting member each, a large number of parts are required, which leads to increases in weight and cost.

SUMMARY

In view of the above-described circumstances, the present invention provides a vehicle seat that can sufficiently ensure the cushioning performance of a seat back, and further, can devise a further lightening of weight and reduction in costs.

Moreover, the present invention provides a vehicle seat and a seat back board that, by a simple structure, can reduce the load to the neck of a passenger at the time of a rear collision.

An aspect of the present invention is a vehicle seat including: a seat back frame that includes a pair of side frames, and that forms a skeleton member of a seat back; a back board portion that is formed by a resin plate, and that is disposed at a back side of the seat back frame; and a back spring section that is at least partially formed of resin, and that is integral with the back board portion, and that spans between the pair of side frames so as to be directly supported, and that is formed so as to be able to flexurally deform in a load application direction due to load toward a seat back rear side being applied.

In accordance with the present aspect, the back board portion, that is formed by a resin plate, is disposed at the back surface side of the seat back frame that structures the skeleton member of the seat back. The back spring section, that is formed of resin and that spans between the pair of side frames so as to be directly supported, is integral with or is provided integrally with the back board portion. Therefore, when a passenger sits in the vehicle seat, load toward the seat back rear side is applied to the back spring section, and that load is transmitted to and supported at the pair of side frames. Further, at this time, the back spring section flexurally deforms in the load application direction.

In this way, in the present aspect, when load is applied from the passenger to the back spring section, the back spring section flexurally deforms and contributes to ensuring the cushioning ability of the seat back, and the load is transmitted to the side frames and supported at the side frames. As a result, the cushioning performance of the seat back is ensured sufficiently. Further, because the back spring section is made of resin and is integral with or provided integrally with the back board portion, the number of parts and the number of assembly processes is reduced as compared with a case in which the back spring section is structured by seat back springs that are made of metal.

In this way, in the vehicle seat relating to the present aspect, the cushioning performance of the seat back can be sufficiently ensured, and a further lightening of weight and reduction in cost can be devised.

In the present aspect, the back spring section may be supported at the side frames via abutting surfaces that planarly contact the pair of side frames and receive load.

In accordance with this structure, when load at the time of sitting is applied from the passenger to the back spring section, that load is received at abutting surfaces that planarly contact the side frames, and is transmitted to the side frames. Namely, the load at the time of sitting is received at a "surface" that the back spring section has, and can be transmitted to the side frames. Therefore, a high load being applied locally to the back spring section that is formed of a resin material is suppressed.

Accordingly, in the vehicle seat in accordance with this structure, the durability of the back spring section that is formed of a resin material is improved.

In the present aspect, the back spring section may be fitted at a seat back front side, onto front portions of the pair of side frames (i.e., fit-together, from a seat back front side, with front portions of the pair of side frames).

In accordance with this structure, the back spring section, that is integral with or is provided integrally with the back board portion, is fitted at the seat back front side, onto the front portions of the pair of side frames. Therefore, not only is the assembling ability extremely good, but also, the load at the time of sitting that is applied from the passenger to the back spring section can be received not only in the direction in which the back spring section comes apart from the side frames, but also in the direction in which the back spring section is fit-together with the side frames. Therefore, the load at the time of sitting can be received extremely rationally.

Accordingly, in the vehicle seat in accordance with this structure, the assembly workability is improved, and the load, that is applied from the passenger to the back spring section, can be smoothly transmitted to the side frames.

In the present aspect, the back spring section may include spring main bodies that are disposed at a distance from each other at a front side of the back board portion and that flexurally deform; and connecting/fixing portions that connect both ends in a seat transverse direction of the spring main bodies and the back board portion and that are fixed to the side frames.

In accordance with this structure, because the back spring section has connecting/fixing portions in addition to the spring main bodies, it suffices for the performances relating to fixing to the side frames to be ensured by the connecting/fixing portions. Namely, the required characteristics relating to fixing to the side frames, and the flexing characteristics required of the spring main bodies, can be designed separately. Therefore, it is unlikely that a situation arises in which one characteristic must be partially sacrificed in order to sufficiently satisfy the other characteristic.

Accordingly, in the vehicle seat in accordance with this structure, designing of the back board portion is easy.

In the above-described structure, the spring main bodies may include lower back spring main bodies that are disposed at a lower portion of the back board portion and are arranged plurally in a seat back height direction, and an upper back spring main body that is disposed at an upper portion of the back board portion, and both ends in the seat transverse direction of the lower back spring main bodies that are plurally provided may be connected in the seat back height direction by a pair of the connecting/fixing portions.

In accordance with this structure, the spring main bodies include lower back spring main bodies and an upper back spring main body, and the lower back spring main bodies are plurally provided in the height direction of the seat back. Therefore, the waist of the seated passenger can be elastically supported in a more suitable state.

Moreover, both ends in the longitudinal direction of the lower back spring main bodies that are plurally provided are connected in the seat back height direction by the pair of connecting/fixing portions, and therefore, the stress that arises at the respective lower back spring main bodies is dispersed via the connecting/fixing portions.

Accordingly, in the vehicle seat in accordance with this structure, the waist supporting performance of the seated passenger can be improved, and excessive stress concentrating at the respective lower back spring main bodies can be mitigated.

In the above-described structure, the pair of left and right side frames may be made to be open cross-sectional shapes at which inner sides, that oppose one another in the seat transverse direction, are open, and the both ends in the seat transverse direction of the spring main bodies may be configured to enter inside cross-sections of the pair of side frames.

In accordance with this structure, the pair of side frames are made to be open cross-sectional shapes at which inner sides, that oppose one another in the seat transverse direction, are open, and the ends in the seat transverse direction of the spring main bodies are configured to enter inside the cross-sections of the side frames. Therefore, the length of the spring main body along the seat transverse direction can be made to be long. Namely, the entire length of the spring main body can be made to be long.

Accordingly, in the vehicle seat in accordance with this structure, the amount of entry (sinking) of the back portion of the seated passenger into the seat back can be increased, without changing the thickness of the seat back.

The above-described structure may further include a limiting component, that has a wall that limits an amount of flexure of the spring main bodies in the load application direction, and the limiting component may be disposed at a seat back rear side of the spring main bodies.

In accordance with this structure, when load toward the seat back rear side is applied to the spring main bodies, the spring main bodies flexurally deform in the load application direction. When the amount of flexure increases, the spring main bodies abut the wall of the limiting component that is provided at the seat back rear side of the spring main bodies. Therefore, the wall of the limiting component also can be made to bear a portion of the load that is applied to the spring main bodies.

Accordingly, in the vehicle seat in accordance with this structure, by limiting the amount of flexure of the back spring section to an appropriate range, stress that arises at the back spring section that is made of resin can be mitigated also when an excessive load is applied to the back spring section.

In the above-described structure, the limiting component may be the back board portion.

In accordance with this structure, because the limiting component is structured by the back board portion, the number of parts does not increase.

Accordingly, in the vehicle seat in accordance with this structure, a flexure amount limiting effect of the back spring section can be obtained without leading to an increase in costs due to an increase in the number of parts.

In the above-described structure, the wall of the limiting component may be a bottom wall of a concave portion that is provided at a seat transverse direction central portion of the back board portion and is concave toward (in a direction of approaching) the back spring section.

In accordance with this structure, the wall of the limiting component is structured by the bottom wall of a concave portion that is concave toward the back spring section at a seat transverse direction central portion of the back board portion. Therefore, the amount of flexure of the back spring section can be limited to any extent by varying the depth of the concave portion at the time of resin molding of the back spring section. Further, the concave portion can be utilized as a space for leg placement of a passenger who is seated in a rear seat.

Accordingly, in the vehicle seat in accordance with this structure, adjustment of the flexing limit of the back spring section can be carried out easily, and the leg placement ability of a passenger seated in a rear seat is also improved.

In the above-described structure, the spring main bodies may include springs made of resin, or the spring main bodies may include springs made of cloth that flexurally deform in the load application direction by extending at a time of application of load toward the seat back rear side.

In accordance with this structure, as compared with springs that are made of resin, the springs that are made of cloth are superior in that it is difficult for creep deformation to occur, they are strong against fatigue, and there is little change in the seating comfort due to temperature-dependent characteristics (expansion in a high-temperature environment and contraction in a low-temperature environment).

Accordingly, in the vehicle seat in accordance with this structure, the cushioning performance of the seat back is improved even more.

The present aspect may further include a limiting component, that includes a wall that limits an amount of flexure of the back spring section in the load application direction, and the limiting component may be disposed at a seat back rear side of the back spring section.

In accordance with this structure, when load toward the seat back rear side is applied to the spring main bodies, the spring main bodies flexurally deform in the load application direction. When the amount of flexure increases, the spring main bodies abut the wall of the limiting component that is provided at the seat back rear side of the spring main bodies. Therefore, the wall of the limiting component also can be made to bear a portion of the load that is applied to the spring main bodies.

Accordingly, in the vehicle seat in accordance with this structure, by limiting the amount of flexure of the back spring section to an appropriate range, stress that arises at the back spring section that is made of resin can be mitigated also when an excessive load is applied to the back spring section.

In the above-described structure, the limiting component may be the back board portion.

In accordance with this structure, because the limiting component is structured by the back board portion, the number of parts does not increase.

Accordingly, in the vehicle seat in accordance with this structure, a flexure amount limiting effect of the back spring section can be obtained without leading to an increase in costs due to an increase in the number of parts.

In the above-described structure, the wall of the limiting component may be a bottom wall of a concave portion that is provided at a seat transverse direction central portion of the back board portion and is concave toward the back spring section.

In accordance with this structure, the wall of the limiting component is structured by the bottom wall of a concave portion that is concave toward the back spring section at a seat transverse direction central portion of the back board portion. Therefore, the amount of flexure of the back spring section can be limited to any extent by varying the depth of the concave portion at the time of resin molding of the back spring section. Further, the concave portion can be utilized as a space for leg placement of a passenger who is seated in a rear seat.

Accordingly, in the vehicle seat in accordance with this structure, adjustment of the flexing limit of the back spring section can be carried out easily, and the leg placement ability of a passenger seated in a rear seat is improved.

The vehicle seat of the present aspect may further include: a seat back pad that is disposed at a front surface side of the back spring section; and a cover that covers a surface of the seat back pad, wherein the back spring section includes plural back spring main bodies that are disposed along a seat transverse direction between the pair of side frames, and are arranged plurally in a seat back height direction, the plural back spring main bodies includes an upper back spring main body that is disposed in a position corresponding to an upper back of a passenger, and a lower back spring main body that is disposed in a position corresponding to a waist of the passenger, and the upper back spring main body is fixed to the pair of side frames at positions further offset toward a vehicle rear side from positions where the lower back spring main body is fixed to the pair of side frames.

In the above configuration, both ends in the seat transverse direction of the upper back spring main body may be supported at rear portions of the pair of side frames, and both ends in the seat transverse direction of the lower back spring main body may be supported at front portions of the pair of side frames.

In accordance with this structure, when the passenger is pushed against the seat back at the time of a rear collision, the chest (upper portion of the back) of the passenger is supported by the upper back spring main body that is provided correspondingly, and the waist of the passenger is supported by the lower back spring main bodies that are provided correspondingly.

Here, in the present structure, the both ends in the seat transverse direction of the lower back spring main bodies are supported at the front portions of the pair of side frames, whereas the both ends in the seat transverse direction of the upper back spring main body are supported at the rear portions of the pair of side frames. Therefore, the rise in the acceleration that is applied to the upper back of the passenger at the time of a rear collision can be delayed. Namely, if the both ends in the seat transverse direction of the upper back spring main body were to be supported at the front portions of the pair of side frames in the same way as the lower back spring main bodies, the rise in the acceleration applied to the upper back of the passenger would be earlier by an amount corresponding to the amount because the supporting position is further toward the seat back front side than in the structure of the present aspect. In contrast, when the supporting position of the upper back spring main body at the side frames is offset toward the seat back rear side as in the present aspect, the rise in the acceleration that is applied to the upper back of the passenger can be delayed thereby. Accordingly, the rise in the acceleration that is applied to the upper back of the passenger can be made to be near the rise in the acceleration of the head of the passenger.

Further, because the present structure provides a difference, in the seat longitudinal direction, between the fixed positions of the upper back spring main body and the lower back spring main bodies to the side frames, the number of parts does not increase.

Accordingly, in the vehicle seat in accordance with the present structure, the load to the neck of the passenger at the time of a rear collision can be reduced by a simple structure.

In the above-described structure, each of the side frame may include a side portion that extends in a seat longitudinal direction in planar sectional view and includes a front portion of the side frame, and a rear flange portion that is bent toward a seat transverse direction inner side from a rear end of the side portion and includes a rear portion of the side frame, and the ends in the seat transverse direction of the upper back spring main body may be fixed to the rear flange portions via upper fixing portions.

In accordance with this structure, the side frame has a side portion and a rear flange portion. The ends in the seat transverse direction of the upper back spring main body are fixed via the upper fixing portions to the rear flange portions, and not the side portions of the side frames. Therefore, when load toward the seat back rear is applied at the time of a rear collision, hardly any excess length arises in the upper back spring main body. If the ends in the seat transverse direction of the upper back spring main body were fixed to the side portions of the side frames, the following behavior would be exhibited when load toward the seat back rear side is applied. That is, the corners of the ends in the seat transverse direction of the upper back spring main body are pulled and extended toward the vehicle rear side. Therefore, it is predicted that the spring constant of the upper back spring main body departs from the target value and that the amount of flexure increases.

In contrast, in this structure, the spring constant of the upper back spring main body is substantially as per the target value, and the error is small.

Accordingly, in the vehicle seat in accordance with this structure, the accuracy with respect to reducing the load to the neck of the passenger at the time of a rear collision is increased.

The above-described structure may further include a pair of lower fixing portions, that are disposed at a seat back front side of the side frames and are fixed to the side frames, the pair of lower fixing portions being integral with the both ends in the seat transverse direction of the lower back spring main body, wherein the lower back spring main body is formed of resin.

In accordance with this structure, the pair of lower fixing portions are provided at the both ends in the seat transverse direction of the lower back spring main bodies, and these lower fixing portions are hooked on the side frames from the seat back front side. Therefore, at the time of sitting, the load received from the passenger is transmitted from the lower back spring main bodies via the pair of lower fixing portions to the side frames. Meanwhile, at the time of a rear collision, the chest (the upper portion of the back) of the passenger enters (sinks) into the seat back because the fixed position of the upper back spring main body is offset further toward the seat back rear side than the fixed positions of the lower back spring main bodies.

Accordingly, in the vehicle seat in accordance with this structure, the load received from the passenger at the time of sitting can be efficiently transmitted to the side frames, and the load to the neck of the passenger at the time of a rear collision can be effectively reduced.

In the above-described structure, plural lower back spring main bodies may be provided in the seat back height direction, and the both ends in a seat transverse direction of the plural lower back spring main bodies may be connected in the seat back height direction by the pair of lower fixing portions.

In accordance with this structure, the plural lower back spring main bodies are provided in the seat back height direction, and the majority of the load that is applied when the passenger sits is received while being dispersed at these lower back spring main bodies. Accordingly, the burden of the load on each of the lower back spring main bodies is reduced. Further, the cushioning ability at the time of sitting is improved because the waist of the passenger is supported at the plural lower back spring main bodies.

Accordingly, in the vehicle seat relating to this structure, the durability of the lower back spring main bodies can be improved, and the cushioning ability at the time of sitting is improved such that fatigue of a passenger can be reduced.

BRIEF DESCRIPTION OF THE DRAWINGS

Exemplary embodiments of the present invention will be described in detail based on the following figures, wherein:

FIG. 13A is a planar sectional view showing the main structure of the fourth exemplary embodiment in a state in which a passenger is seated, FIG. 13B is a planar sectional view showing a main structure relating to a comparative example in a state in which a passenger is seated, and FIG. 13C is a planar sectional view showing the main structure of the comparative example when a rear collision has occurred.

DETAILED DESCRIPTION

First Exemplary Embodiment

A first exemplary embodiment of a vehicle seat is described hereinafter using FIG. 1 through FIG. 4. Arrow FR that is shown in these drawings indicates the vehicle front side, arrow UP indicates the vehicle upper side, and arrow IN indicates the vehicle transverse direction inner side.

<Overall Structure>

Figure 1:
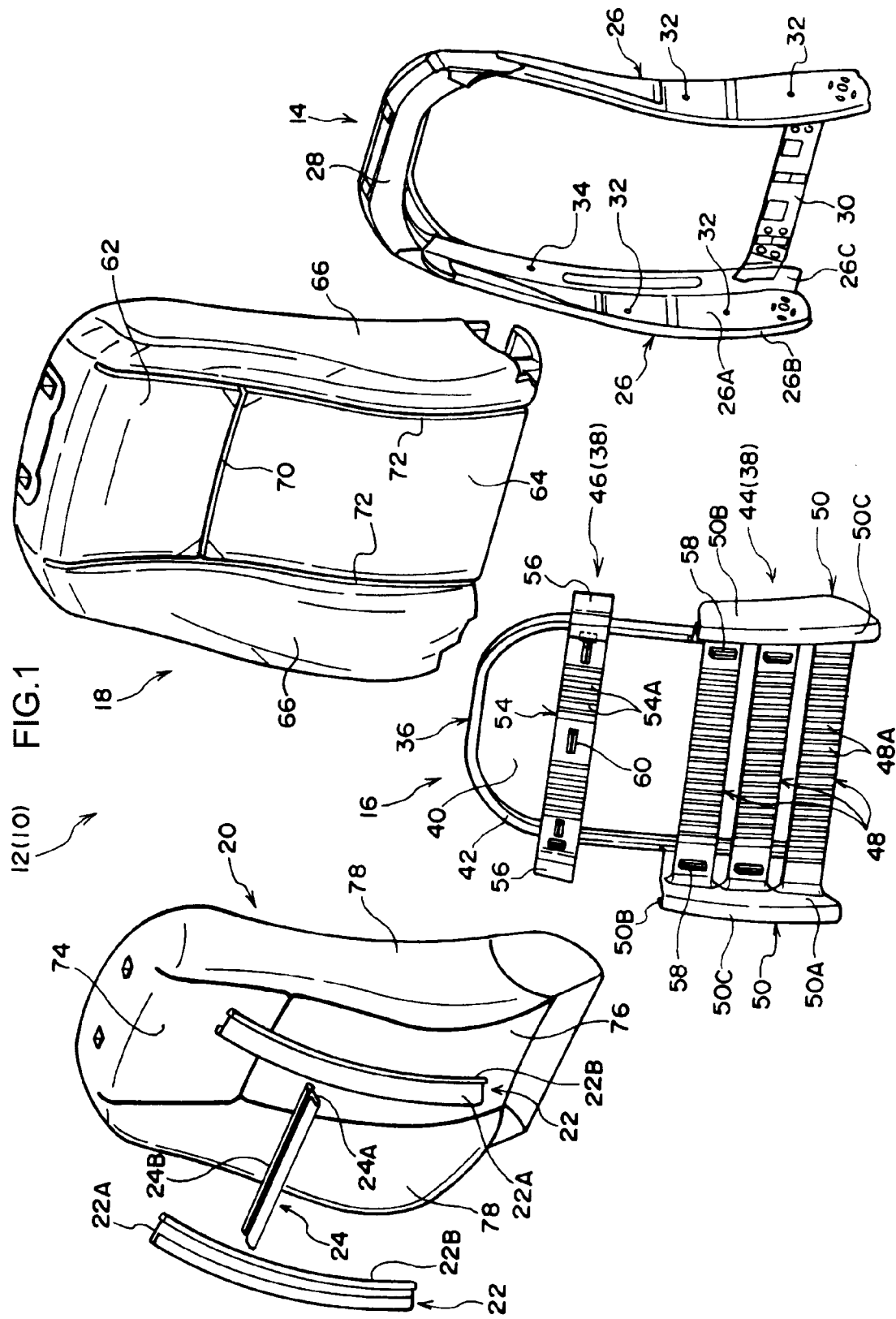
FIG. 1 is an exploded perspective view of a seat back of a vehicle seat relating to a first exemplary embodiment.
Figure 4:
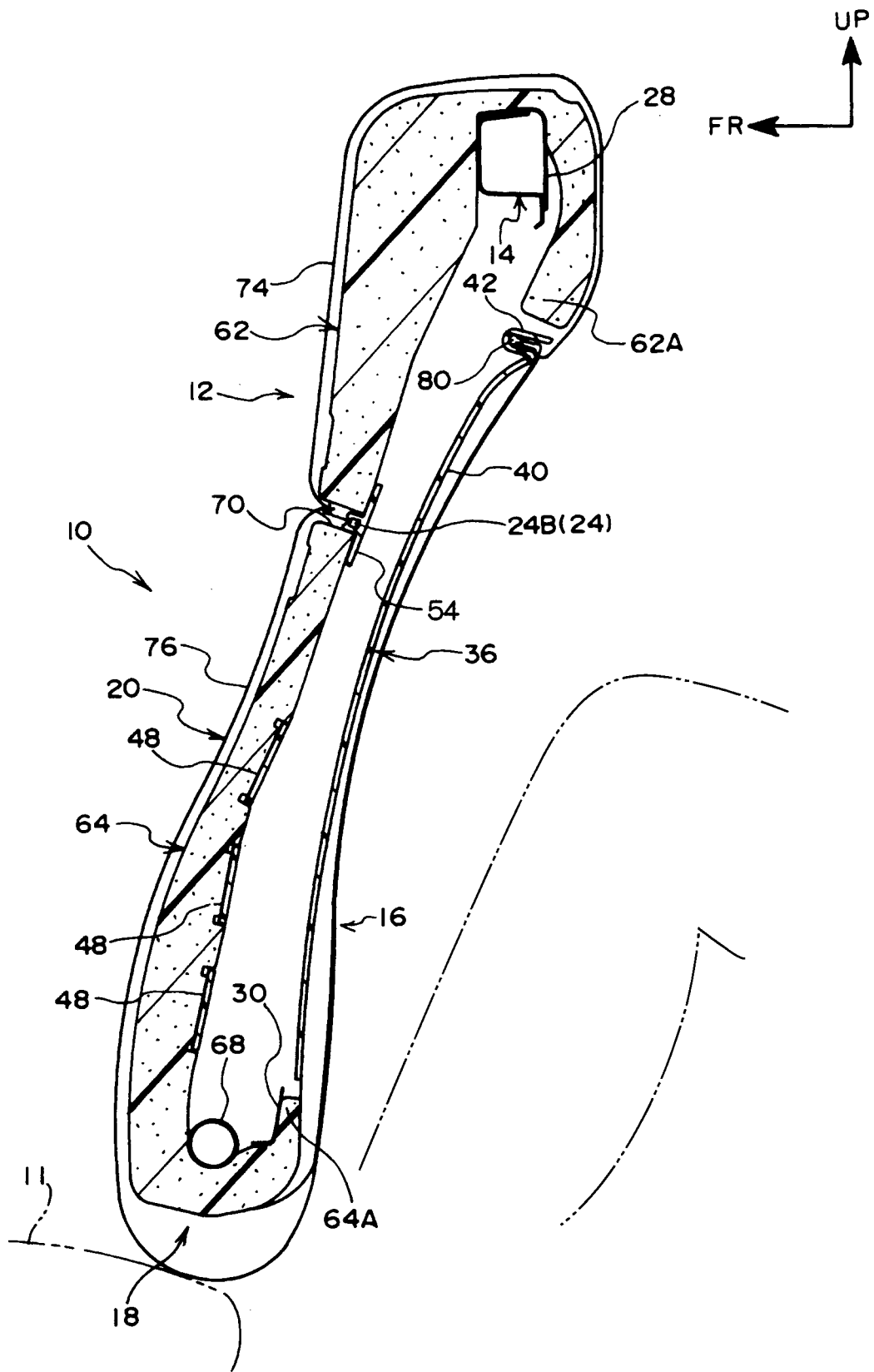
FIG. 4 is an enlarged vertical sectional view showing the assembled state of the seat back shown in FIG. 1.

An exploded perspective view of a seat back of a vehicle seat relating to the present exemplary embodiment is shown in FIG. 1. Note that, in FIG. 1, the angles at which the respective structural elements are viewed are drawn so as to vary slightly for ease of viewing. Further, a vertical sectional view of the vehicle seat having this seat back is shown in FIG. 4. As shown in these figures, a vehicle seat 10 includes a seat cushion 11 (see FIG. 4) on which a passenger sits, a seat back 12 that is reclinably supported at the rear end of the seat cushion 11, and an unillustrated headrest that is supported at the top end of the seat back 12 so as to be able to move up and down.

As shown in FIG. 1, the seat back 12 includes a seat back frame 14 that is made of metal and structures a skeleton member of the seat back 12, a resin-spring-integrated back board (hereinafter simply called "seat back board") 16 that is mounted to the front surface side of the seat back frame 14, a seat back pad 18 that structures a cushion member of the seat back 12 and is mounted from the front surface side of the seat back board 16 and is supported at the seat back frame 14, a cover (surface skin) 20 that covers mainly the front surface of the seat back pad 18, and vertical mounting members 22 and a lateral mounting member 24 for mounting the cover 20 to the seat back board 16. The respective structural elements are described in detail hereinafter.

<Structure of Seat Back Frame 14>

As shown in FIG. 1 through FIG. 4, the seat back frame 14 is formed in a rectangular frame shape in front view (i.e., when viewing from the front surface of the vehicle, and hereinafter, description is given with the directions of the vehicle and the directions of the vehicle seat 10 being the same). Specifically, the seat back frame 14 includes a pair of left and right side frames 26 that are disposed so as to oppose one another in the vehicle transverse direction, an upper frame 28 that is inverse U-shaped and connects the upper ends of the side frames 26 to one another, and a lower frame 30 that connects the lower ends of the side frames 26 to one another in the vehicle transverse direction. The above-described seat back 12 is manufactured by all of the four members including the upper frame 28 being press molded, but embodiments are not limited thereto and another frame structure may be employed. For example, the upper frame only may be structured by a pipe member that is bent in an inverse U shape, or the upper frame and the pair of side frames may be structured by a single pipe member that is bent in an inverse U shape.

Figure 2:
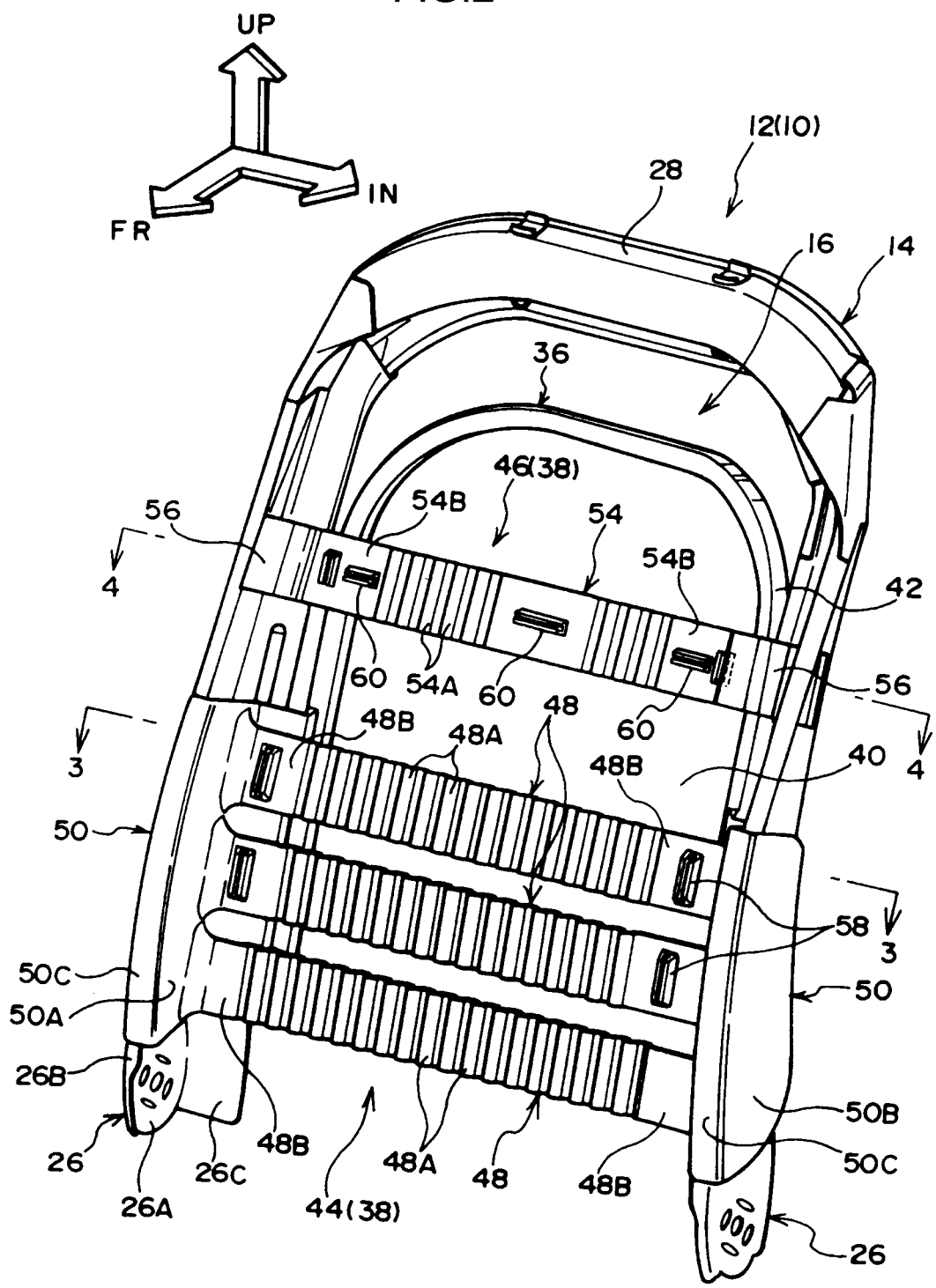
FIG. 2 is a perspective view showing a state in which a seat back board is assembled to a seat back frame shown in FIG. 1.
Figure 3:
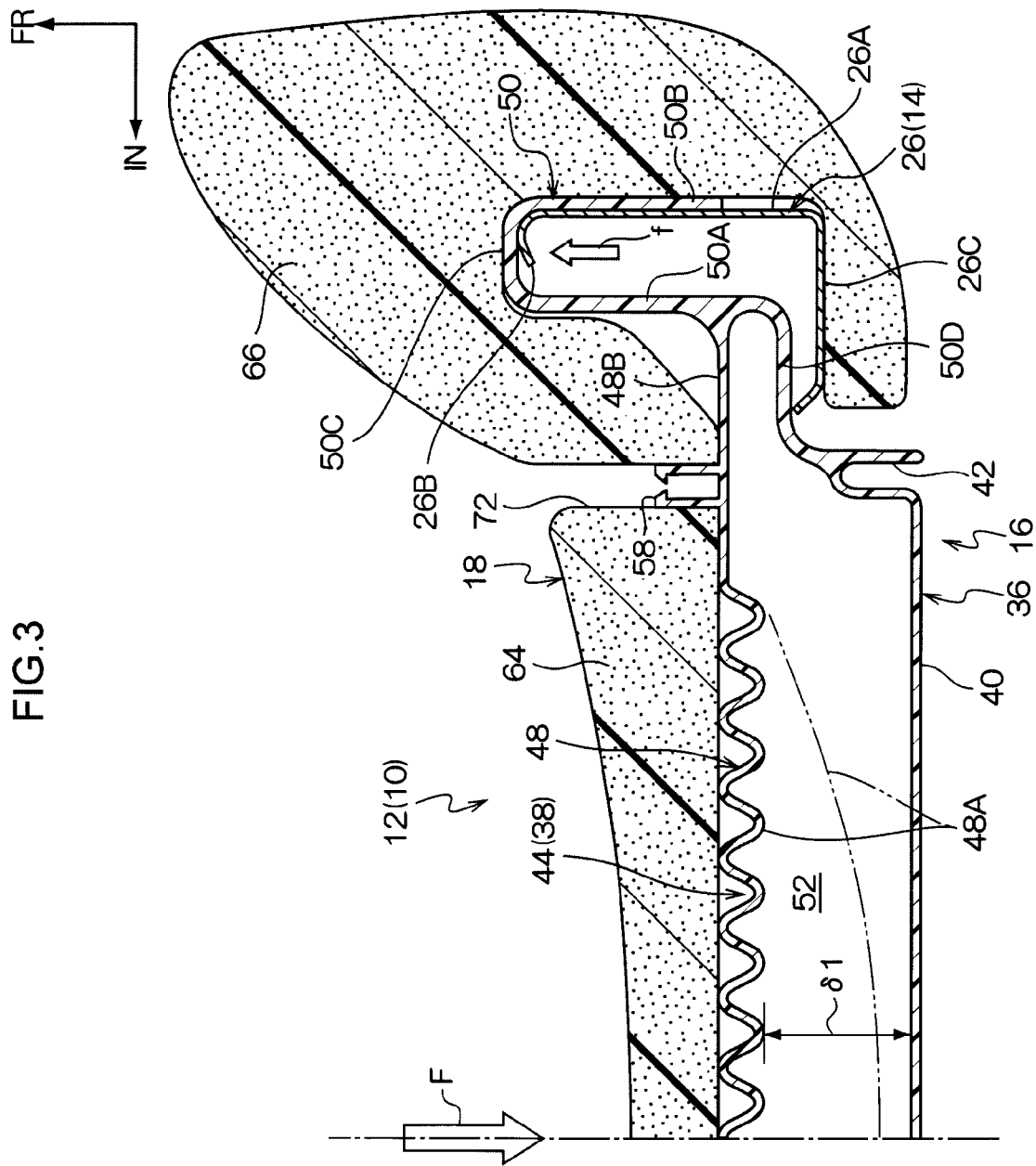
FIG. 3 is an enlarged planar sectional view showing an assembled state of the seat back shown in FIG. 1.

Next, the cross-sectional structure of the side frames 26 is described. As shown in FIG. 2 and FIG. 3, the side frame 26 is structured by a side wall 26A, a front wall 26B, and a rear wall 26C. When viewed solely, the side frame 26 is formed in a substantial L shape in a planar sectional view, and, when viewed as the left and right pair, the side frames 26 are formed in open cross-sectional shapes whose inner sides, that oppose one another in the seat transverse direction, are open in planar sectional view. The length of the side wall 26A in the vehicle front-rear (longitudinal) direction becomes more narrow from the lower end toward the upper end. Further, plural mounting holes 32 (see FIG. 1) are formed in separate positions along the vertical direction in the lower portion of the side wall 26A. The front wall 26B extends from the front end of the side wall 26A via an arcuate surface toward the seat transverse direction inner side, and is bent rearward at a slight incline at the distal portion. The rear wall 26C extends from the rear end of the side wall 26A toward the seat transverse direction inner side, and the distal end portion thereof is bent at an incline toward the vehicle front side. The width of the rear wall 26C is set to be sufficiently wider than the width of the front wall 26B. Further, a mounting hole 34 (see FIG. 1) is formed in the upper portion side of the rear wall 26C as well.

<Structure of Resin-Spring-Integrated Back Board (Seat Back Board) 16>

Next, the structure of the seat back board 16 that is a main structure of the vehicle seat 10 relating to the present exemplary embodiment is described in detail. As shown in FIG. 1 through FIG. 4 (and FIG. 1 and FIG. 2 in particular), the seat back board 16 has a back board portion 36 that is formed by a resin plate and is disposed at the back surface side of the seat back frame 14, and a back spring section 38 that is made of resin and is provided integrally with the back board portion 36 and spans between the pair of side frames 26 so as to be directly supported. The back spring section 38 is formed so as to be able to flexurally deform in a load application direction (toward the vehicle rear side) due to load being applied toward the seat back rear side.

The back board portion 36 includes a board main body 40 that is formed to be one size smaller than the seat back frame 14, and an anchor frame 42 that is U-groove-shaped and is molded integrally with the outer peripheral portion of the board main body 40. Specifically, the board main body 40 is formed to be one size smaller than the inner peripheral edge of the opening portion of the seat back frame 14 that is formed in a substantially rectangular frame shape. Further, in the state of being assembled to the seat back frame 14, the board main body 40 is disposed slightly toward the vehicle rear side, between the distal ends (inner ends) of the rear walls 26C of the side frames 26. Accordingly, the board main body 40 can be assembled from the vehicle front side of the seat back frame 14 (see FIG. 3). The cross-sectional shape of the anchor frame 42 is a U shape whose vehicle rear side is open. This anchor frame 42 is used in order to anchor the outer peripheral portion of the cover 20 that is described hereafter, but also has the function of reinforcing the plate-shaped board main body 40 and increasing the surface rigidity of the back board portion 36 on the whole.

The back spring section 38 includes a lower back spring section 44 that is formed integrally with the lower portion of the back board portion 36, and an upper back spring section 46 that is formed integrally with the upper portion of the back board portion 36. The upper back spring section 46 is provided independently at a position that is set apart, by a predetermined distance in the seat back height direction, from the lower back spring section 44.

The lower back spring section 44 includes three lower back spring main bodies 48 that are disposed in parallel at three stages (tiers) vertically in the seat back height direction, and lower connecting/fixing portions 50 that connect the both ends in the longitudinal directions (seat transverse direction) of these three lower back spring main bodies 48 in the seat back height direction, and connect them to the back board portion 36 as well, and are fixed to the side frames 26. The number of the lower back spring main bodies 48 that structure the lower back spring section 44 is not limited, and may be changed appropriately in relation to the cushioning performance that is required. For example, a single lower back spring section may be provided by widening the vertical width thereof, or, plural lower back spring main sections such as two or four or more may be provided.

The planar sectional shape of the lower back spring main body 48 is formed in a wave shape. A wave-shaped portion (flexing portion) 48A extends due to load toward the back board portion 36 side (the vehicle rear side) being applied, and, due thereto, the wave-shaped portion 48A flexurally (elastically) deforms toward the back board portion 36 that is the load application direction. Vertical resin claws 58, that are described later and are for mounting the cover 20, are formed integrally in vicinities of both ends 48B in the longitudinal direction of the lower back spring main bodies 48 that are at the upper stage and the middle stage, and the wave-shaped portions 48A are not formed at the regions where these vertical resin claws 58 are formed.

As shown in FIG. 3, the above-described back board portion 36 is disposed at a position that is apart, by a predetermined distance toward the vehicle rear side, from the lower back spring section 44. Namely, a predetermined gap 52 is formed between the lower back spring section 44 and the back board portion 36. The lower back spring main bodies 48 are elastically deformable within the range of this gap 52 (within the range of δ1). Namely, the back board portion 36 functions as a limiting component that limits the amount of flexure of the lower back spring section 44 to less than or equal to a predetermined amount (less than or equal to δ1).

The lower connecting/fixing portion 50 is formed in a substantially inverse U shape as seen in planar sectional view, and has an inner side wall 50A to which the longitudinal end 48B of the lower back spring main body 48 is connected, an outer side wall 50B that is disposed parallel to the inner side wall 50A and that is anchored to the outer side surface of the side wall 26A of the side frame 26 in a planarly-contacting state, a front wall 50C that connects the front end of the inner side wall 50A and the front end of the outer side wall 50B in the vehicle transverse direction and is anchored to the front wall 26B of the side frame 26 in a partial planarly-contacting state, and a rear wall 50D that is connected to the back board portion 36 from the rear end of the inner side wall 50A with respect to the longitudinal end 48B of the lower back spring main body 48. The above-described outer side wall 50B and front wall 50C correspond to "abutting surfaces".

The both ends 48B in the seat transverse direction of the above-described lower back spring main bodies 48 that are arranged in three stages vertically are structured as flat portions at which the wave-shaped portions 48A are not formed, and are connected to one another by the pair of lower connecting/fixing portions 50. Namely, the lower back spring main bodies 48 are provided at plural stages in the seat back height direction, and the lower back spring section 44 is made integral with the back board portion 36 due to the longitudinal both ends of these lower back spring main bodies 48 being connected by the pair of lower connecting/fixing portions 50. The longitudinal direction dimension of the lower connecting/fixing portions 50 is set such that the lower connecting/fixing portions 50 include a range from the top edge of the lower back spring main body 48 at the uppermost stage to the bottom edge of the lower back spring main body 48 at the lowermost stage.

The lower connecting/fixing portion 50 is fixed to the side frame 26 due to the outer side wall 50B thereof being fixed, from the seat transverse direction outer side, by an unillustrated fixing means to the mounting holes 32 of the side wall 26A of the side frame 26. Any of various configurations such as a configuration in which resin clips are formed integrally with the outer side wall 50B and are engaged with the mounting holes 32, or a configuration that fastens by a fastening tool such as rivets, screws, or bolts and weld nuts or the like, or a configuration of adhering by an adhesive or the like, can be used as the fixing means. In the state in which the lower connecting/fixing portion 50 is fixed to the side frame 26, the rear wall 50D is disposed in parallel to the rear wall 26C of the side frame 26. Due thereto, the end 48B in the longitudinal direction of the lower back spring main body 48 enters inside the cross-section of the side frame 26.

The upper back spring section 46 is basically structured similarly to the lower back spring section 44, and includes an upper back spring main body 54 and upper connecting/fixing portions 56 that are described later. Further, a wave-shaped portion 54A is formed at the upper back spring main body 54 so as to extend and flexurally (elastically) deform when load toward the back board portion 36 (the vehicle rear side) is applied. Moreover, in addition to the vertical resin claws 58 being formed integrally at both ends 54B in the longitudinal direction of the upper back spring main body 54, lateral resin claws 60 are formed integrally at the both ends 54B and the central portion in the longitudinal direction. Further, the upper connecting/fixing portions 56 are formed in shapes that protrude out toward the seat back transverse direction outer sides, and are set to a longitudinal direction dimension that is accommodated between the side walls 26A of the above-described side frames 26. The upper connecting/fixing portions 56 are fixed to the side frames 26 due to the upper connecting/fixing portions 56 being fixed, from the seat rear side, by an unillustrated fixing means to the mounting holes 34 of the rear walls 26C.

In the present exemplary embodiment, as described above, the back spring section 38 is configured by separately providing the lower back spring section 44 and the upper back spring section 46, but embodiments are not limited to the same, and the both may be connected and formed integrally. Namely, a structure may be employed in which the lower connecting/fixing portions 50 extend toward the seat back upper side and further connect the both ends in the longitudinal direction of the upper back spring main body 54. This configuration is described in the second exemplary embodiment that is described hereafter.

Further, in the present exemplary embodiment, the upper back spring section 46 includes only one stage (one spring section), but embodiments are not limited to the same and may include plural stages (plural spring sections). Alternately, a configuration in which plural stages of back spring sections are provided at uniform intervals from the upper portion to the lower portion of the back board portion 36.

<Structure of Seat Back Pad 18>

As shown in FIG. 1, the seat back pad 18 generally includes a pad central upper portion 62, a pad central lower portion 64, and a pair of left and right pad side portions 66. The seat back pad 18 is fabricated of urethane foam or the like.

As shown in FIG. 4, the vertical sectional shape of the pad central upper portion 62 is formed in a substantial J shape that is turned upside-down and backwards. The pad central upper portion 62 is fixed, from the seat back upper side, to the upper frame 28 of the seat back frame 14. The vertical sectional shape of the pad central lower portion 64 is formed in a substantial J shape that is turned backwards. Further, the lower portion of the pad central lower portion 64 forms a shape that bulges-out in a convexly curved shape toward the vehicle front side than the upper portion of the pad central lower portion 64. This pad central lower portion 64 is fixed, from the seat back lower side, on a connecting rod 68 that connects the lower ends of the side frames 26 in the seat transverse direction. The connecting rod 68 is disposed in parallel at the front side of the lower frame 30 of the seat back frame 14.

Further, as shown in FIG. 3, the lateral sectional shape of the pad side portion 66 is formed in a substantial C shape. This pad side portion 66 is mounted so as to be trained around the side frame 26 that is in a state in which the lower connecting/fixing portion 50 is mounted thereto. The lower portion of the pad side portion 66 forms a shape that bulges-out in a convexly curved shape toward the vehicle front side than the upper portion of the pad side portion 66. Further, the pad side portion 66 has a shape that protrudes out further toward the vehicle front side than the pad central upper portion 62 and the pad central upper portion 64 in order to ensure a side supporting ability for the passenger.

Returning to FIG. 4, in vertical sectional view, the seat back board 16 is disposed so as to range from a back side lower end 62A of the pad central upper portion 62 to a back side upper end 64A of the pad central lower portion 64. Specifically, the back side upper end 64A of the pad central lower portion 64 is formed to be thinner than the back side lower end 62A, and the lower end of the back board portion 36 is disposed at that thinner portion so as to be overlapped in the front-rear direction (at the rear side thereof).

A lateral slit 70, that serves as a pass-through groove for suspending-in the cover 20, is formed between the above-described pad central upper portion 62 and pad central lower portion 64. Further, a pair of left and right vertical slits 72 for suspending-in the cover 20 is formed between the pad central upper portion 62, the pad central lower portion 64, and the pad side portions 66.

The slit widths of the lateral slit 70 and the vertical slits 72 are set to lengths such that the vertical mounting members 22 and the lateral mounting member 24, that are described hereafter, can be inserted through. Further, all of these lateral slit 70 and vertical slits 72 are formed in rectilinear shapes, and pass-through the seat back pad 18 in the thickness direction thereof (that is the vehicle front-rear direction).

<Structure of Cover 20>

As shown in FIG. 1, the cover 20 is formed to a size such that it can cover the seat back pad 18 from the front side. Further, the cover 20 has a cover central upper portion 74, a cover central lower portion 76, and a pair of left and right cover side portions 78, in accordance with the divided structure of the seat back pad 18.

<Mounting Structure of Cover 20>

The cover 20 is mounted by the vertical mounting members 22, the lateral mounting member 24, the vertical resin claws 58, the lateral resin claws 60, an outer periphery anchor portion 80, and the like.

<Structures of Vertical Mounting Members 22 and Lateral Mounting Member 24>

As shown in FIG. 1, the vertical mounting member 22 is structured by a mounting member main body 22A that is formed in the shape of a strip, and an engaging portion 22B that is made of resin and provided at one edge of the main body 22A and is formed in a wedge shape. The other edge of the main body 22A is mounted in advance by sewing to the cover central upper portion 74, the cover central lower portion 76, and the cover side portion 78. Note that, in FIG. 1, the vertical mounting members 22 (and the lateral mounting member 24) are shown so as to be separated from the cover 20, but the vertical mounting members 22 (and the lateral mounting member 24) are actually mounted to the cover 20 in advance.

In correspondence therewith, the vertical resin claws 58 are formed integrally at the back spring main bodies 48, further toward the both outer sides in the seat transverse direction than the wave-shaped portions 48A. The engaging portions 22B of the vertical mounting members 22 can elastically engage with the vertical resin claws 58. Further, the central portion of the cover 20 is mounted to the seat back board 16 in the vertical direction, by elastically engaging the engaging portions 22B of the pair of vertical mounting members 22 with the corresponding vertical resin claws 58 of the respective back spring main bodies 48.

Similarly, the lateral mounting member 24 is structured by a mounting member main body 24A that is formed in the shape of a strip, and an engaging portion 24B that is made of resin and provided at one edge of the main body 24A and is formed in a wedge shape. The other edge of the main body 24A is mounted in advance by sewing to the cover central upper portion 74, the cover central lower portion 76.

In correspondence therewith, the lateral resin claws 60 are formed integrally at the back spring main body 48 that is disposed at the uppermost stage, at the central portion in the seat transverse direction and at two places at the both outer sides thereof. The engaging portion 24B of the lateral mounting member 24 can be elastically engaged with the lateral resin claws 60. Further, as shown in FIG. 4, the central portion of the cover 20 is mounted to the seat back board 16 in the lateral direction, by elastically engaging the engaging portion 24B of the lateral mounting member 24 that is provided at three places, with the respective lateral resin claws 60 of the back spring main body 48 that is disposed at the uppermost stage.

Moreover, the outer periphery anchor portion (piece) 80, that is formed in the shape of an arrowhead, is mounted by sewing to an appropriate position of the outer periphery of the cover 20. The outer periphery anchor piece 80 is inserted, from the vehicle rear side, and anchored to the anchor frame 42 of the back board portion 36. Due thereto, the outer periphery of the cover 20 is removably anchored to the back board portion 36.

Operation and Effects of Present Exemplary Embodiment

The operation and effects of the present exemplary embodiment are described next.

The above-described vehicle seat 10 has the seat back board 16 at which the back spring section 38 that is made of resin is formed integrally with the back board portion 36 that is made of resin. Further, this seat back board 16 is fit-together, from the vehicle front side, with the seat back frame 14 that is made of metal. Specifically, the lower connecting/fixing portions 50 are fit-together with the side frames 26 from the vehicle front side, and, in this state, are fixed to the side frames 26 from the seat transverse direction outer sides. Further, the upper connecting/fixing portions 56 are inserted into the inner sides of the side frames 26 from the vehicle front side, and thereafter, are fixed to the rear walls 26C from the vehicle front side. Thereafter, the seat back pad 18 is mounted to the seat back frame 14 from the vehicle front side, and further, the cover 20 is placed on the seat back pad 18. The vertical mounting members 22 and the lateral mounting member 24 are fixed in advance to the cover 20 by sewing, and, while the cover 20 is being placed on the seat back pad 18, the vertical mounting members 22 and the lateral mounting member 24 are inserted in and anchored to the corresponding vertical slits 72 and lateral slit 70.

The seat cushion 11 and the unillustrated headrest are mounted to the seat back 12 that is assembled as described above, so as to form the vehicle seat 10. When a passenger sits in the vehicle seat 10, load toward the seat back rear side (this is expressed by arrow F in FIG. 3) is applied to the back spring section 38 via the cover 20 and the seat back pad 18. Therefore, the lower back spring main bodies 48 and the upper back spring main body 54 flexurally deform toward the seat back rear side that is the load application direction (refer to the two-dot chain line in FIG. 3). Further, because the load at this time is transmitted to the side frames 26 by the lower connecting/fixing portions 50 and the upper connecting/fixing portions 56, reaction force (this is expressed by arrow fin FIG. 3) toward the vehicle front side is generated from the side frames 26.

In this way, in the present exemplary embodiment, when load is applied from the passenger to the back spring section 38, the back spring section 38 flexurally deforms and contributes to ensuring the cushioning ability of the seat back 12, and the load is transmitted to the side frames 26 and supported at the side frames 26. As a result, the cushioning performance of the seat back 12 is ensured sufficiently. Further, because the back spring section 38 is made of resin and is provided integrally with the back board portion 36, the number of parts and the number of assembly processes is reduced as compared with a case in which the back spring section 38 is formed by seat back springs that are made of metal. As a result, in accordance with the present exemplary embodiment, the cushioning performance of the seat back 12 can be ensured sufficiently, and further lightening of weight and reduction in cost can be devised.

Further, as described above, when load at the time of sitting is applied from the passenger to the back spring section 38, and in particular to the lower back spring section 44 that supports the waist of the passenger, that load is received at the front walls 50C that planarly contact the side frames 26, and is transmitted to the side frames 26. Namely, the load at the time of sitting is received at a "surface" that the back spring section 38 has, and can be transmitted to the side frames 26. Therefore, a high load is not applied locally to the lower back spring section 44 that is formed of a resin material. As a result, the durability of the lower back spring section 44 that is formed of a resin material is improved.

Moreover, because the lower back spring section 44 in particular that is provided integrally with the back board portion 36 is fit-together, from the seat back front side, with the front portions of the pair of side frames 26, the assembling ability extremely is good. Further, due to this configuration, the load at the time of sitting that is applied from the passenger to the lower back spring section 44 can be received not only in the direction in which the lower back spring section 44 comes apart from the side frames 26, but also in the direction in which the lower back spring section 44 is fit-together with the side frames 26. Accordingly, the load at the time of sitting can be received extremely rationally. As a result, the assembly workability of the seat back board 16, and eventually the vehicle seat 10, is improved, and the load applied from the passenger to the back spring section 38 can be smoothly transmitted to the side frames 26.

Further, the lower back spring section 44 and the upper back spring section 46 have the lower connecting/fixing portions 50 and the upper connecting/fixing portions 56, in addition to the lower back spring main bodies 48 and the upper back spring main body 54. Therefore, it suffices for the performances relating to fixing to the side frames 26 to be ensured by the lower connecting/fixing portions 50 and the upper connecting fixing portions 56. Namely, the required characteristics relating to fixing to the side frames 26, and the flexing characteristics required of the lower back spring main bodies 48 and the upper back spring main body 54 can be designed separately. Therefore, it is unlikely that a situation arises in which one characteristic must be partially sacrificed in order to sufficiently satisfy the other characteristic. As a result, in accordance with the present exemplary embodiment, designing of the back board portion 36 is easy.

Moreover, because the lower back spring main bodies 48 of the lower back spring section 44 are plurally provided in the height direction of the seat back, the waist of the seated passenger can be elastically supported in a suitable state. Further, because the lower connecting/fixing portions 50 are provided in a range that extends from the top edge of the lower back spring main body 48 that is provided at the uppermost stage to the bottom edge of the lower back spring main body 48 that is provided at the lowermost stage, the stress generated by the respective lower back spring main bodies 48 when the passenger sits on the vehicle seat 10 is dispersed via the lower connecting/fixing portions 50. As a result, the waist supporting performance of the seated passenger is improved, and excessively large stress concentrating at the respective lower back spring main bodies 48 can be mitigated.

Further, the pair of side frames 26 is made to be open cross-sectional shapes whose inner sides, that oppose one another in the seat transverse direction, are open, and the longitudinal ends 48B of the lower back spring main bodies 48 are configured to enter inside the cross-sections of the side frames 26. Therefore, the lengths, along the seat transverse direction, of the lower back spring main bodies 48 can be made to be long. Namely, the entire lengths of the lower back spring main bodies 48 can be made to be long. As a result, the amount of entry (sinking) of the back portion of the seated passenger can be increased without changing the thickness of the seat back 12.

Moreover, when load toward the seat back rear side is applied to the back spring section 38, the back spring section 38 flexurally deforms in the load application direction. When the amount of flexure increases, the back spring section 38 abuts the front surface of the back board portion 36 that is provided at the seat back rear side of the back spring section 38. Therefore, the back board portion 36, that is a wall of the limiting component, can also partially bear the load that is applied to the back spring section 38. As a result, in accordance with the present exemplary embodiment, by limiting the amount of flexure of the back spring section 38 to an appropriate range, stress that arises at the back spring section 38 that is made of resin can be mitigated also when an excessively large load is applied to the back spring section 38.

Further, because the above-described limiting component is structured by the back board portion 36, the number of parts does not increase. Therefore, a flexure amount limiting effect of the back spring section 38 can be obtained without leading to an increase in costs due to an increase in the number of parts.

Moreover, in the present exemplary embodiment, because the back board portion 36 is disposed at the back surface of the seat back 12, even if the leg portions of a passenger seated in a rear seat abut the back board portion 36, a large load is not applied to the leg portions of the passenger. Accordingly, felt or the like, that is provided so that the leg portions of a passenger seated in a rear seat do not directly hit seat springs (S springs) made of metal, can be omitted.

Second Exemplary Embodiment

Figure 5:
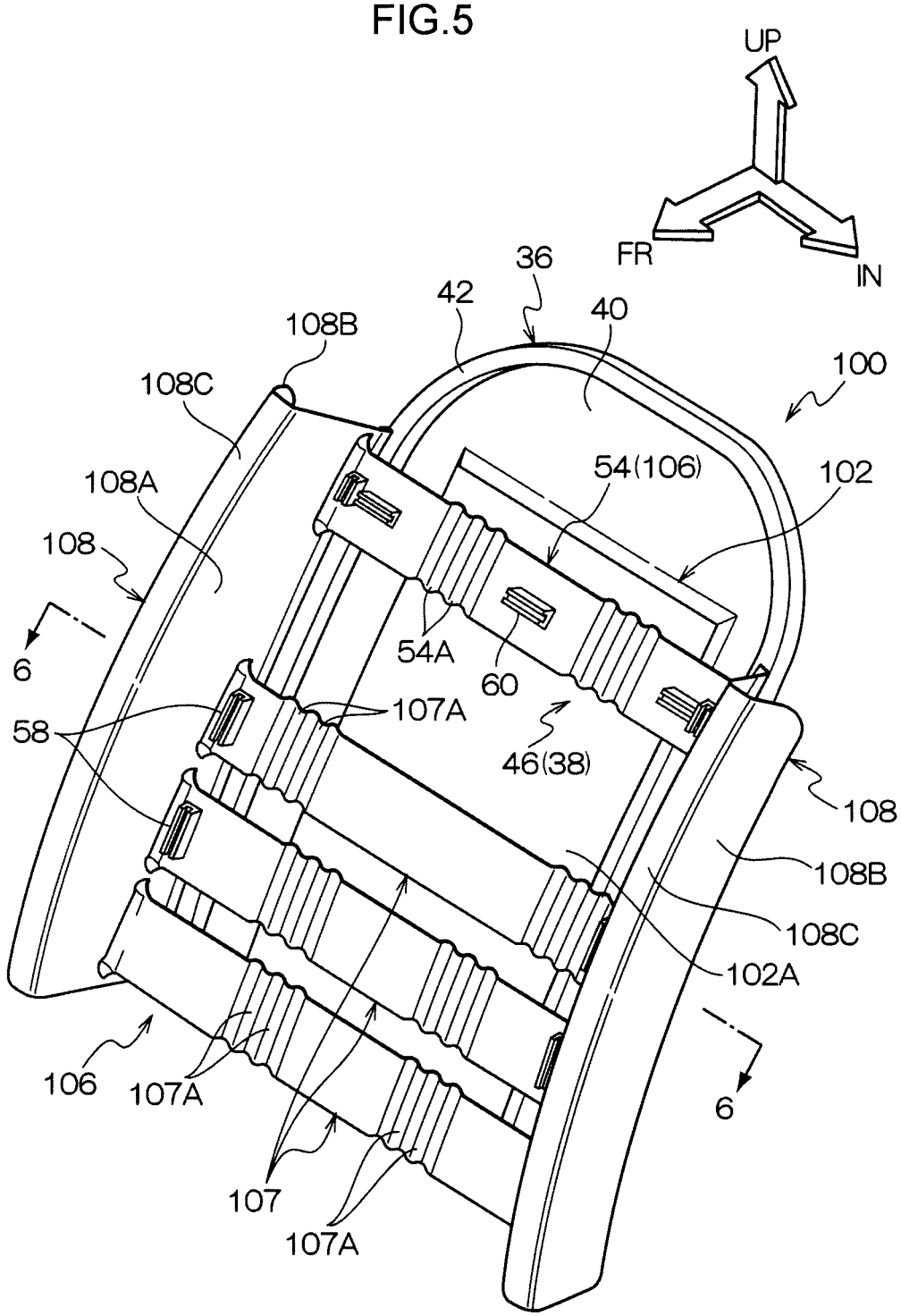
FIG. 5 is a perspective view of a seat back board relating to a second exemplary embodiment.
Figure 6:
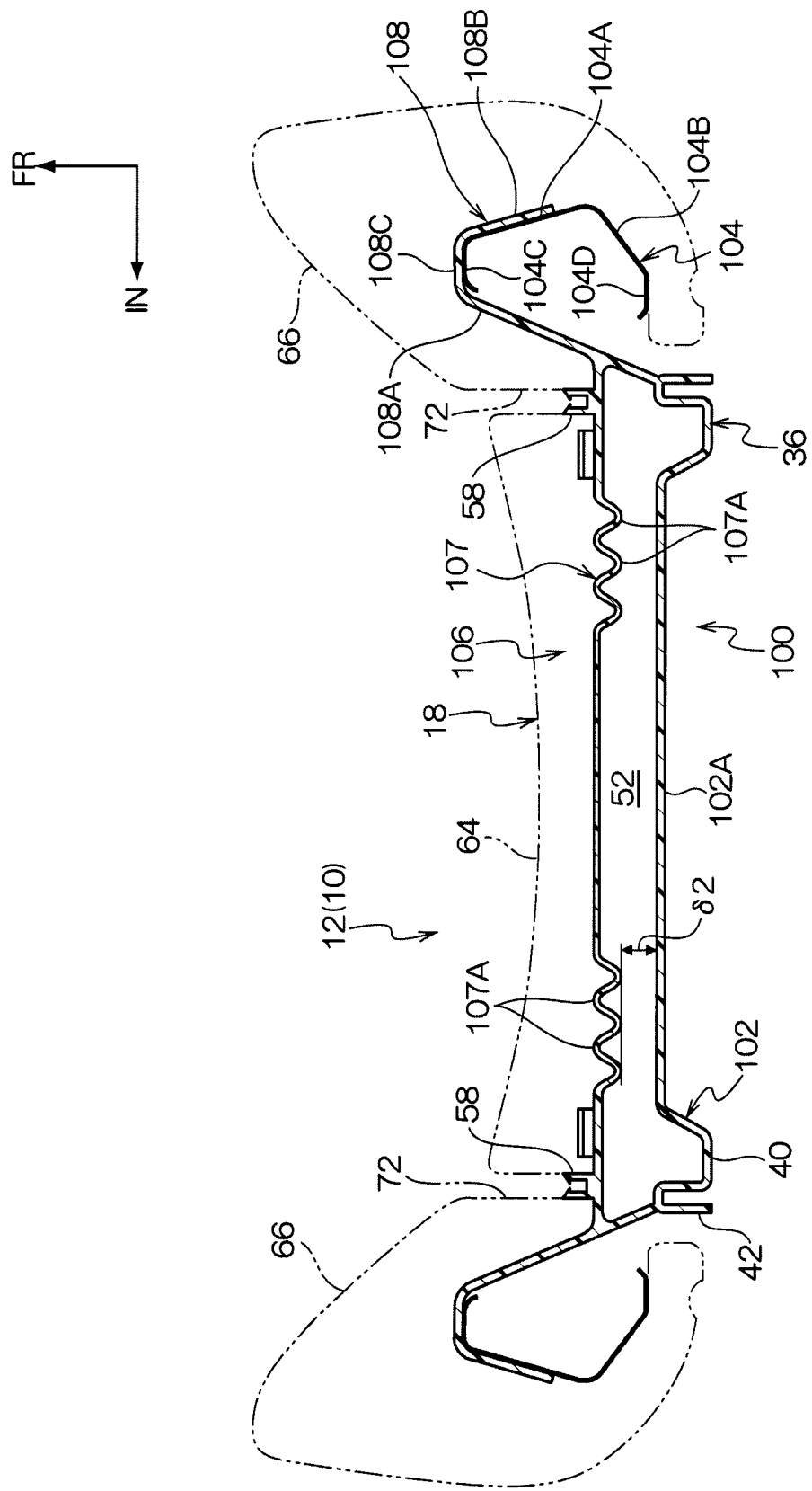
FIG. 6 is an enlarged planar sectional view taken along line 6-6 of FIG. 5.
Figure 7:
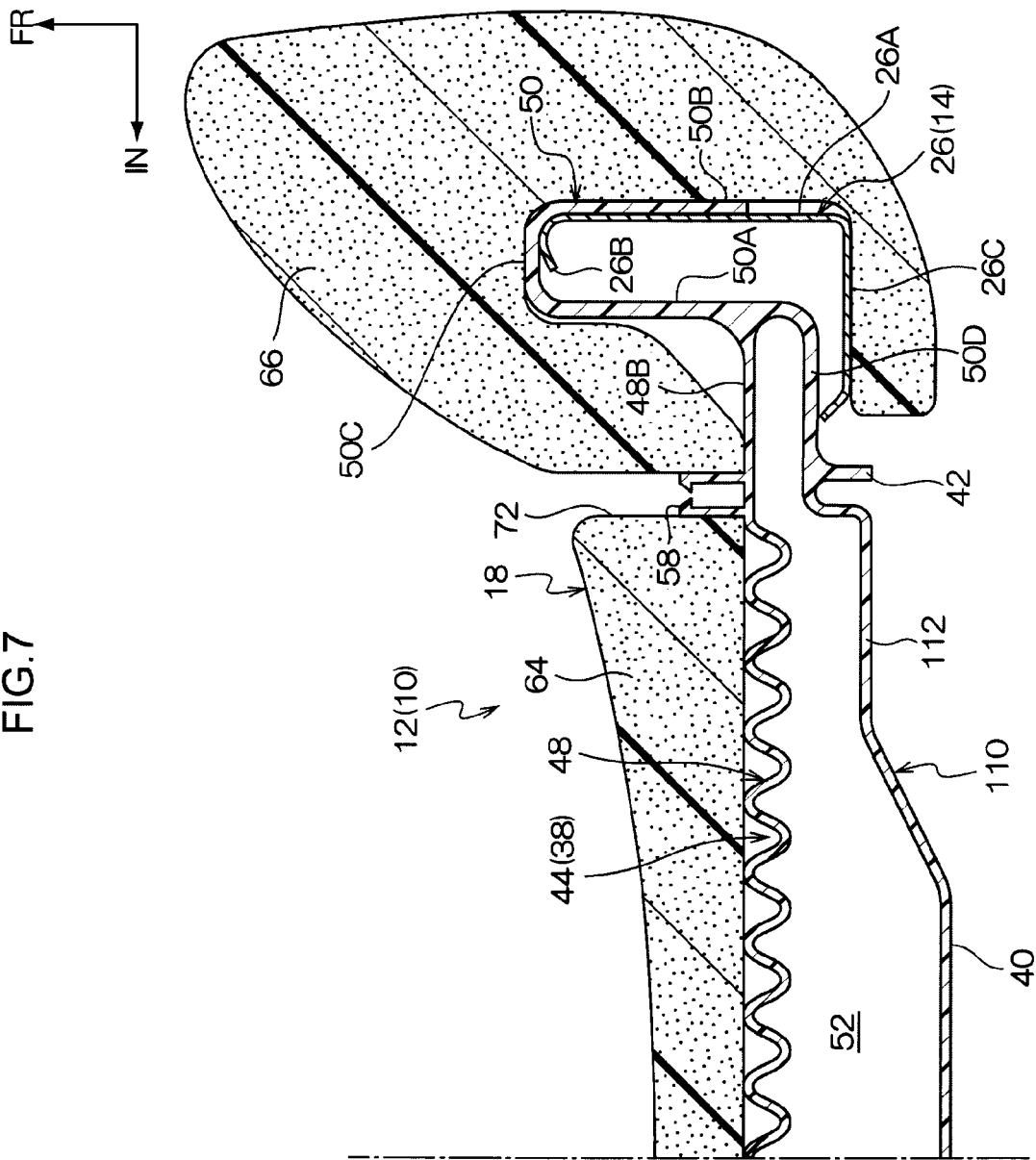
FIG. 7 is an enlarged planar sectional view showing an assembled state of a seat back, relating to a modified example of the second exemplary embodiment.

Next, a second exemplary embodiment of a vehicle seat is described using FIG. 5 through FIG. 7. The same structural portions as the first exemplary embodiment are denoted by the same numbers, and description thereof is omitted.

The exemplary embodiment shown in FIG. 5 and FIG. 6 has a feature in which a concave portion 102, that serves as a limiting component that is concave toward the vehicle front side, is formed in the back board portion 36 of a seat back board 100. In the first exemplary embodiment, the board main body 40 of the back board portion 36 limits the amount of flexure of the lower back spring main bodies 48 and the upper back spring main body 54, but the present exemplary embodiment is configured such that a bottom wall 102A of the concave portion 102 limits the amount of flexure of the lower back spring main bodies 48 and the upper back spring main body 54.

Hereinafter, the structures that differ from the first exemplary embodiment, other than the above-described point, are summarily described. In the exemplary embodiment shown in FIG. 5 and FIG. 6, first, the planar sectional shape of a side frame 104 differs slightly from that of the side frame 26 of the above-described first exemplary embodiment. Specifically, as shown in FIG. 6, as seen in planar sectional view, the side walls are structured by a front side wall 104A and a rear side wall 104B that are bent toward the seat transverse direction outer side at the front-rear direction intermediate position of the side frame 104, and a front wall 104C that is bent from the front end of the front side wall 104A toward the central direction of the seat transverse direction, and a rear wall 104D that is bent from the rear end of the rear side wall 104B toward the central direction of the seat transverse direction.

As shown in FIG. 5, lower back spring main bodies 107 and the upper back spring main body 54 of the seat back board 100 are connected integrally by a pair of left and right connecting/fixing portions 108. Accordingly, a back spring section 106 includes the plural lower back spring main bodies 107 and the single upper back spring main body 54 and the pair of connecting/fixing portions 108. Further, the planar sectional shape of the connecting/fixing portion 108 is structured by three walls that are an inner side wall 108A, an outer side wall 108B, and a front wall 108C that serves as an abutting surface and connects the front ends of the inner and outer side walls 108A and 108B in the seat transverse direction, so as to conform to the planar sectional shape of the side frame 104. The inner side wall 108A is structured as an inclined wall that opens toward the seat transverse direction outer side. Further, the front wall 108C abuts the front wall 104C of the side frame 104 in a planarly-contacting state, and the outer side wall 108B abuts the front side wall 104A of the side frame 104 in a planarly-contacting state. The outer side wall 108B is fixed by an unillustrated fixing means to the side frame 104. Moreover, wave-shaped portions 107A of the lower back spring main bodies 107 are not formed over the entire region in the longitudinal direction of the lower back spring main bodies 107, and are formed partially at plural places in the longitudinal direction (at two places to the left and the right in the exemplary embodiment shown in FIG. 5 and FIG. 6).

(Operation and Effects)

In accordance with the above-described structure as well, the basic structure is the same as the first exemplary embodiment, and therefore, operation and effects that are similar to the first exemplary embodiment are obtained.

In addition, in the present exemplary embodiment, the wall of the limiting means is structured at the back board portion 36 by the bottom wall 102A of the concave portion 102 that is concave toward the back spring section 106. Therefore, by varying the depth of the concave portion 102 at the time of resin molding of the back spring section 106, an amount of flexure δ2 (see FIG. 6) of the back spring section 106 can be limited to any extent. Further, the concave portion 102 can be utilized as a space for leg placement of a passenger who is seated in a rear seat. As a result, adjustment of the flexing limit of the back spring section 106 can be carried out easily, and the leg placement ability of a passenger seated in a rear seat can be improved. The concave portion 102 can also be utilized as a storage space for magazines or the like.

In the exemplary embodiment shown in FIG. 5 and FIG. 6, the wall that serves as the limiting component is provided by forming the concave portion 102 in the back board portion 36, but embodiments are not limited to the same. For example, as shown in FIG. 7, the wall that serves as the limiting component may be set by forming step portions 112 at both ends in the seat transverse direction of the back board portion 110. In this case, the step portions 112 limit the amount of flexure of the back spring section 106.

Further, rather than a structure that is formed integrally with the back board portion 36 such as the concave portion 102 or the step portions 112, the amount of flexure of the back spring section 106 may be limited by mounting a separate part that serves as a limiting component to the board main body 40.

Third Exemplary Embodiment

Figure 8:
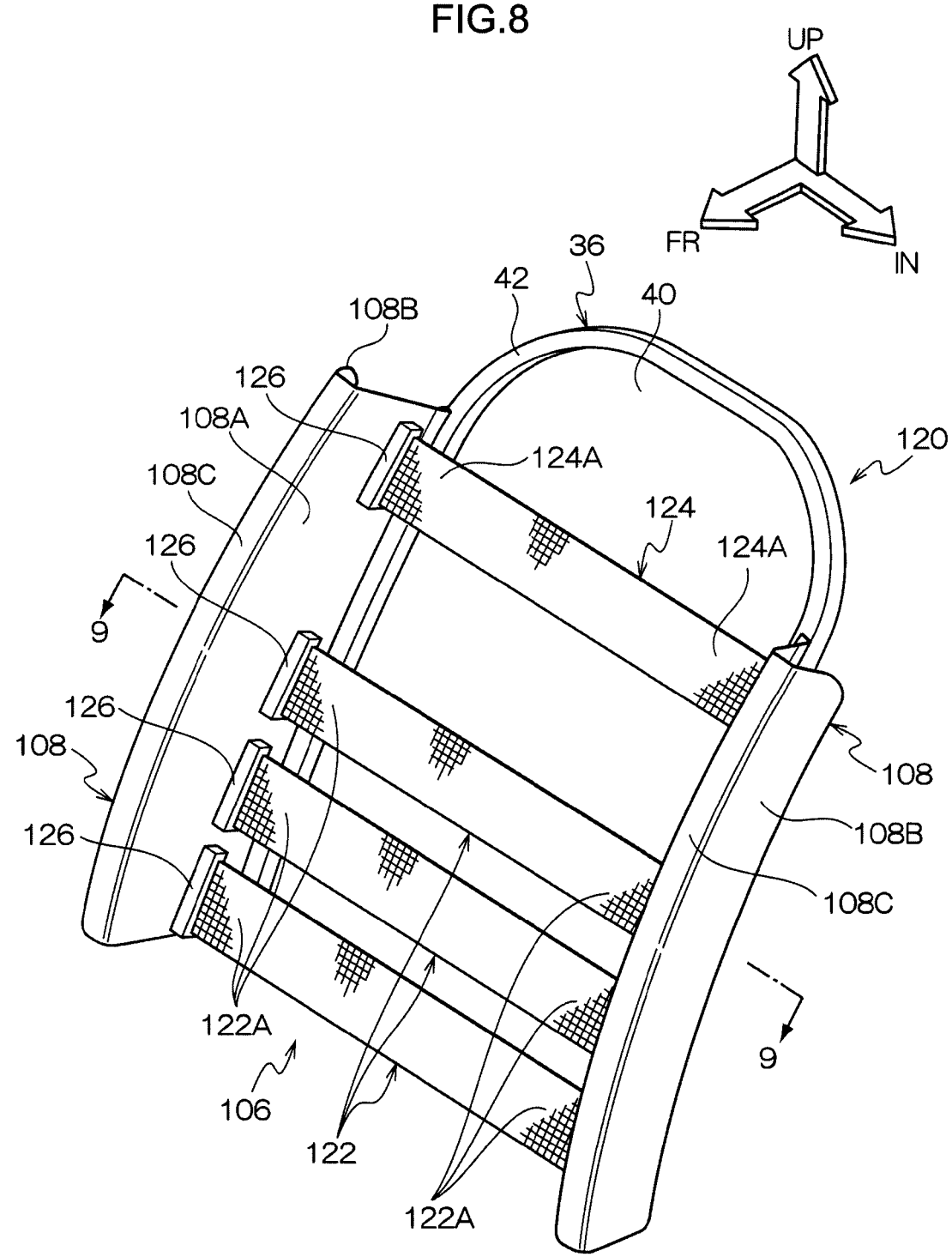
FIG. 8 is a perspective view of a seat back board relating to a third exemplary embodiment.
Figure 9:
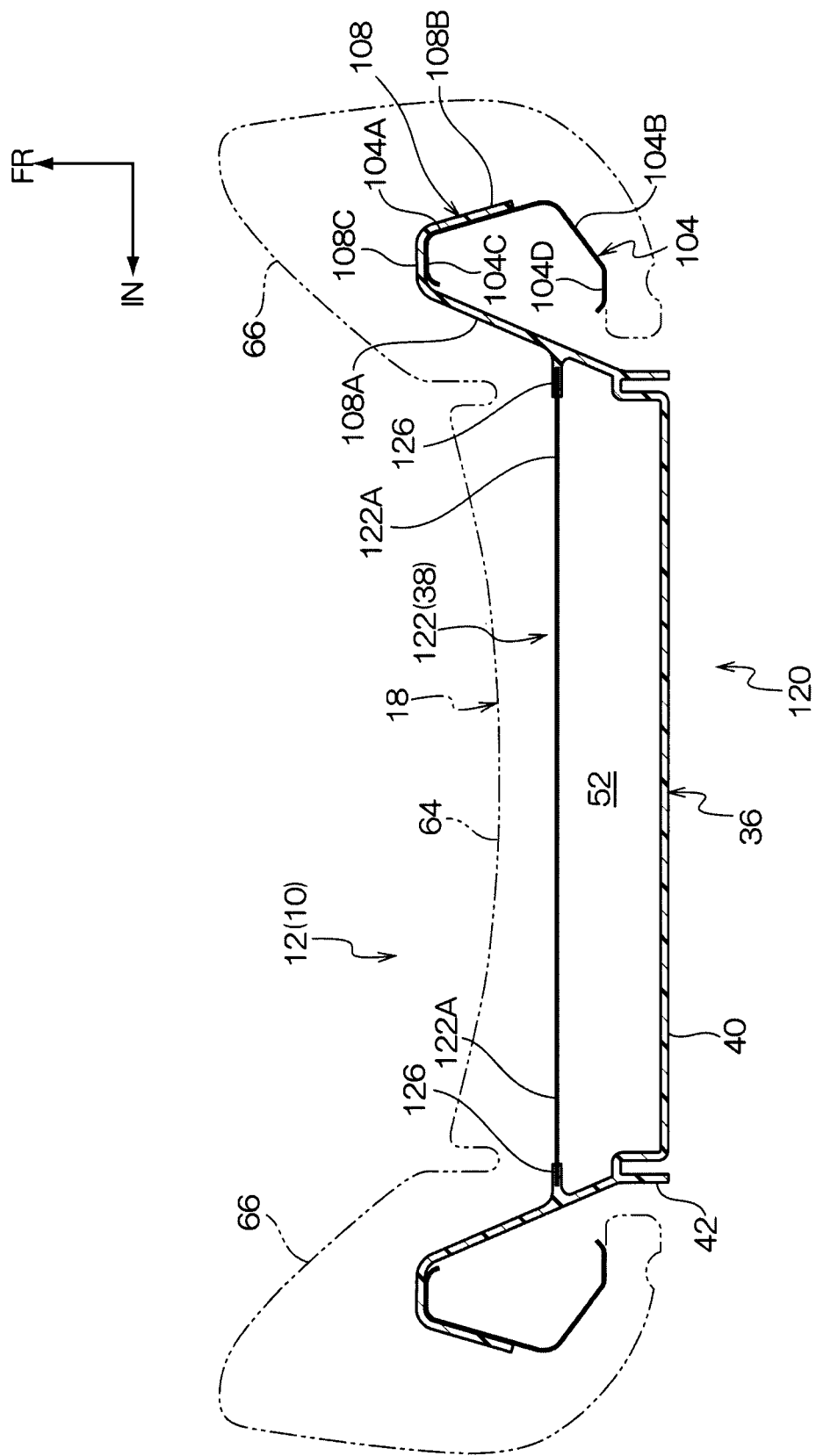
FIG. 9 is an enlarged planar sectional view taken along line 9-9 of FIG. 8.
Figure 10:
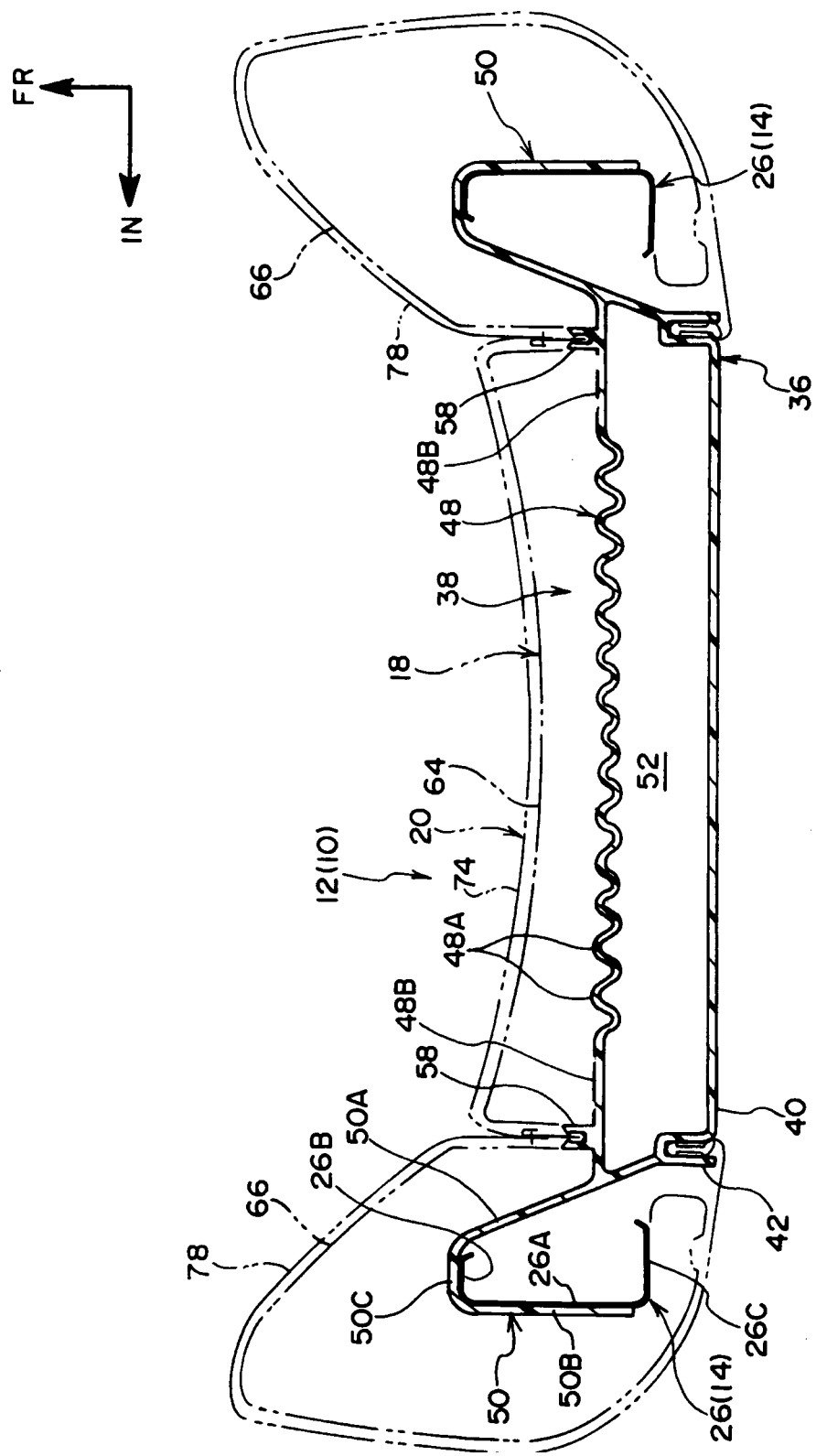
FIG. 10 is an enlarged planar sectional view showing an assembled state of a seat back, in a state of being cut along line 3-3 of FIG. 2.

Next, a third exemplary embodiment of a vehicle seat is described using FIG. 8 and FIG. 9. The same structural portions as the first exemplary embodiment and the like are denoted by the same numbers, and description thereof is omitted.

As shown in FIG. 8 and FIG. 9, the third exemplary embodiment has a feature in which a seat back board 120 is structured by using lower cloth springs 122 and an upper cloth spring 124. Namely, the first exemplary embodiment is structured such that the lower back spring main bodies 48 and the upper back spring main body 54 of the seat back board 16 are all made of resin and flexurally deform, but, in the present exemplary embodiment, the lower cloth springs 122 and the upper cloth spring 124 are used instead of the lower back spring main bodies 48 and the upper back spring main body 54.

Specifically, the lower cloth springs 122 and the upper cloth spring 124 are respectively formed in the shapes of strips that are long in the seat transverse direction. In correspondence therewith, fixing portions 126, that are parallelepiped and block-shaped and are for fixing ends 122A in the longitudinal direction of the lower cloth springs 122 and ends 124A in the longitudinal direction of the upper cloth spring 124, are formed integrally with inner side walls 108A of connecting/fixing portions 108. The ends 122A in the longitudinal direction of the lower cloth springs 122 and the ends 124A in the longitudinal direction of the upper cloth spring 124 are embedded in the fixing portions 126 at the time of resin molding of the seat back board 120. Due to load of a predetermined value or more being applied toward the seat back rear side, the lower cloth springs 122 and the upper cloth spring 124 flex in the load application direction and elastically deform. The lower cloth springs 122 and the upper cloth spring 124 do not come out from the fixing portions 126.

(Operation and Effects)

In accordance with the above-described structure as well, the basic structure is the same as the first exemplary embodiment, and therefore, operation and effects that are similar to the first exemplary embodiment are obtained.

In addition, as compared with springs that are made of resin, the springs that are made of cloth such as the lower cloth springs 122 and the upper cloth spring 124 are superior in that it is difficult for creep deformation to occur, they are strong against fatigue, and that there is little change in the seating comfort due to temperature-dependent characteristics (expansion in a high-temperature environment and contraction in a low-temperature environment and the like). Accordingly, the cushioning performance of the seat back 12 can be improved even more.

Fourth Exemplary Embodiment

Next, an exemplary embodiment of a vehicle seat and a seat back board is described using FIG. 10 through FIG. 13. The same structural portions as the above-described exemplary embodiments are denoted by the same numbers, and description thereof is omitted.

<Main Structure>

Figure 11:
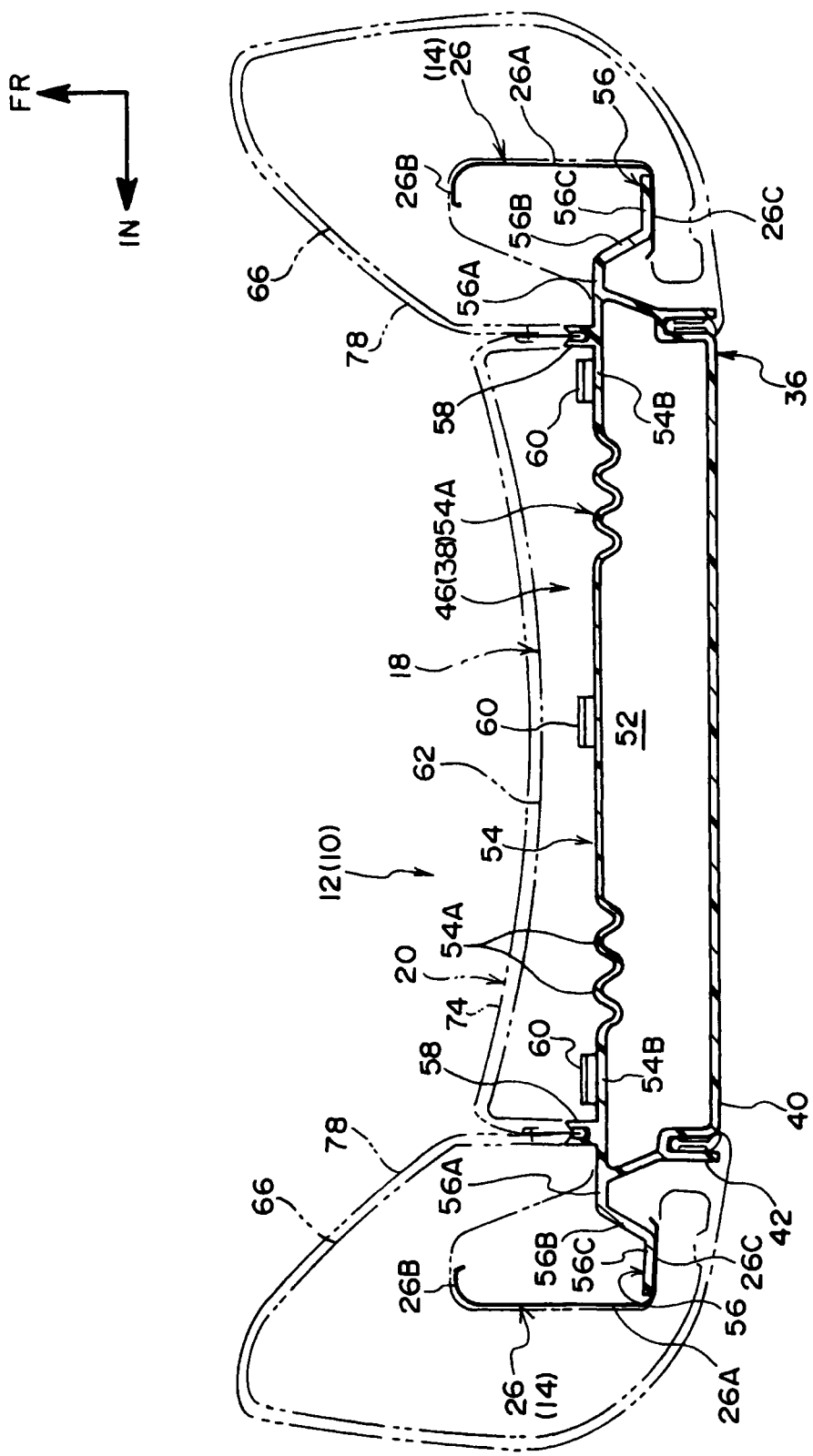
FIG. 11 is an enlarged planar sectional view showing the assembled state of the seat back, in a state of being cut along line 4-4 of FIG. 2.

Here, as shown in FIG. 1 and FIG. 11, the pair of upper connecting/fixing portions 56 are formed integrally with the both ends 54B in the seat transverse direction of the upper back spring main body 54. The pair of upper connecting/fixing portions 56 is set to a longitudinal direction dimension that is accommodated between the side walls 26A of the side frames 26 and also includes the upper back spring main body 54 as well.

The upper connecting/fixing portion 56 projects-out toward the seat back transverse direction outer side, and is formed in a step shape in planar sectional view. Specifically, the upper connecting/fixing portion 56 is structured by an extending portion 56A that extends as is from the end 54B in the seat transverse direction of the upper back spring main body 54 toward the seat transverse direction outer side, an intermediate portion 56B that is bent from the distal end of the extending portion 56A obliquely toward the seat back rear side, and a fixing portion 56C that is bent from the distal end of the intermediate portion 56B toward the seat transverse direction outer side.

The extending portion 56A extends toward the side frame 26 in order to connect the upper back spring main body 54 to the side frame 26. Further, the intermediate portion 56B serves to connect the distal end of the extending portion 56A to the rear wall 26C that is the region of fixing to the side frame 26. The amount of offset, toward the seat back rear side, with respect to the position of fixing the lower back spring main bodies 48 to the side frame 26 is obtained (can be adjusted) due to the existence of the intermediate portion 56B. Moreover, the fixing portion 56C serves to fix the end 54B in the seat transverse direction of the upper back spring main body 54 to the rear wall 26C of the side frame 26. The upper connecting/fixing portion 56 is fixed to the side frame 26 by the fixing portion 56C being fixed, from the seat back front side, to the mounting hole 34 of the rear wall 26C by an unillustrated fixing means. Note that any of various configurations such as a configuration in which a resin clip is formed integrally with the fixing portion 56C and is engaged with the mounting hole 34, or a configuration that fastens by a fastening tool such as rivets, screws, or bolts and weld nuts or the like, or a configuration of adhering by an adhesive or the like, can be used as the fixing means.

(Operation and Effects)

The operation and effects of the present exemplary embodiment are described next.

The above-described vehicle seat 10 has the seat back board 16 at which the back spring section 38 that is made of resin is formed integrally with the back board portion 36 that is made of resin. Further, this seat back board 16 is fit-together, from the vehicle front side, with the seat back frame 14 that is made of metal. Specifically, the lower connecting/fixing portions 50 are fit-together with the side frames 26 from the vehicle front side, and, in this state, are fixed to the side frames 26 from the seat transverse direction outer sides. Further, the upper connecting/fixing portions 56 are inserted into the inner sides of the side frames 26 from the vehicle front side, and thereafter, are fixed to the rear walls 26C from the vehicle front side. Thereafter, the seat back pad 18 is mounted to the seat back frame 14 from the vehicle front side, and further, the cover 20 is placed on the seat back pad 18. The vertical mounting members 22 and the lateral mounting member 24 are fixed in advance to the cover 20 by sewing, and, while the cover 20 is being placed on the seat back pad 18, the vertical mounting members 22 and the lateral mounting member 24 are inserted in the corresponding vertical slits 72 and lateral slit 70, and are anchored to the vertical resin claws 58 and the lateral resin claws 60, respectively. Moreover, the outer periphery anchor portion 80 of the cover 20 is anchored to the anchor portion of the back board portion 36.

The seat cushion 11 and the unillustrated headrest are mounted to the seat back 12 that is assembled as described above, so as to form the vehicle seat 10. When a passenger sits in the vehicle seat 10, load toward the seat back rear side is applied to the back spring section 38 via the cover 20 and the seat back pad 18. Therefore, the lower back spring main bodies 48 and the upper back spring main body 54 flexurally deform toward the seat back rear side that is the load application direction. Further, because the load at this time is transmitted to the side frames 26 by the lower connecting/fixing portions 50 and the upper connecting/fixing portions 56, reaction force toward the vehicle front side is generated from the side frames 26.

When load is applied from the passenger to the back spring section 38 in this way, the back spring section 38 flexurally deforms and contributes to ensuring the cushioning ability of the seat back 12, and the load is transmitted to the side frames 26 and supported at the side frames 26. As a result, the cushioning performance of the seat back 12 is ensured sufficiently. Further, because the back spring section 38 is made of resin and is provided integrally with the back board portion 36, the number of parts and the number of assembly processes is reduced as compared with a case in which the back spring section 38 is structured by seat back springs that are made of metal.

At the time of a rear collision, the passenger is pushed against the seat back 12 by inertia. At this time, the chest (upper portion of the back) of the passenger is supported by the upper back spring main body 54 that is provided in correspondence therewith, and the waist of the passenger is supported by the lower back spring main bodies 48 that are provided in correspondence therewith.

Here, in the present exemplary embodiment, the both ends 48B in the seat transverse direction of the lower back spring main bodies 48 are fixed to the front portions of the side frames 26 (i.e., the front sides of the side walls 26A) via the lower connecting/fixing portions 50, whereas the both ends 54B in the seat transverse direction of the upper back spring main body 54 are fixed to the rear portions of the side frames 26 (i.e., the rear walls 26C) via the upper connecting/fixing portions 56. Therefore, the rise in the acceleration that is applied to the upper back of the passenger at the time of a rear collision can be delayed. Namely, if the both ends 54B in the seat transverse direction of the upper back spring main body 54 were to be fixed to the front portions of the pair of side frames 26 in the same way as the lower back spring main bodies 48, the rise in the acceleration applied to the upper back of the passenger would be earlier by an amount corresponding to the amount because the fixed position is further toward the seat back front side than in the structure of the present exemplary embodiment. In contrast, when the fixed position of the upper back spring main body 54 to the side frames 26 is offset toward the seat back rear side as in the present exemplary embodiment, the rise in the acceleration that is applied to the upper back of the passenger can be delayed thereby. Accordingly, the rise in the acceleration that is applied to the upper back of the passenger can be made to be near the rise in the acceleration of the head of the passenger.

Figure 12:
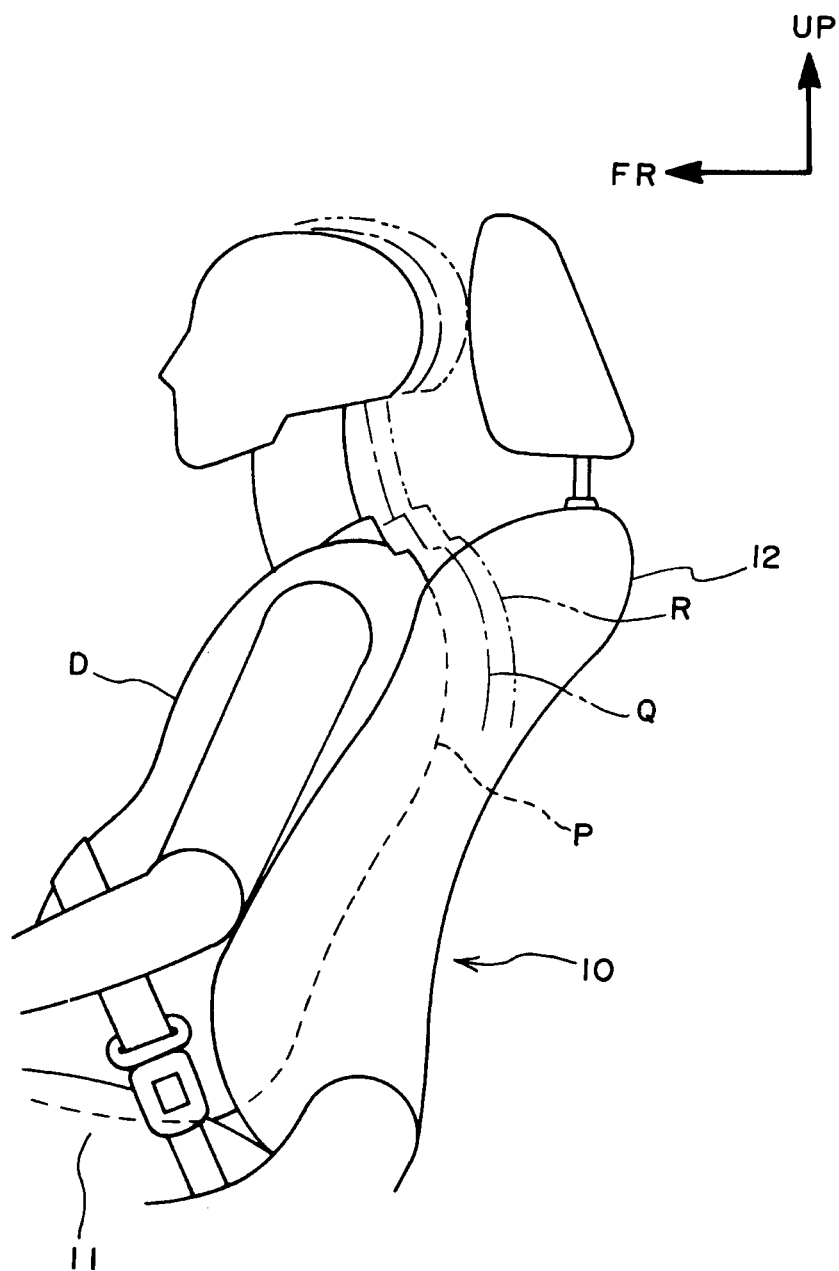
FIG. 12 is an explanatory drawing for explaining effects of a fourth exemplary embodiment, and is a side view showing the situation at the time of a rear collision in a state in which a passenger is seated on a vehicle seat of the fourth exemplary embodiment.

This effect will be illustrated using FIG. 12. The behavior of a dummy D at the time of a rear collision is shown in a side view in FIG. 12. The state of the passenger before the rear collision is shown by the solid lines and dashed lines P (what is important is the dashed line portion showing the back of the passenger). If the structure of the present exemplary embodiment were not employed, the fixed position of the upper back spring main body 54 to the side frames 26 would be at the front side of the side frames 26, in the same way as the lower back spring main bodies 48. Therefore, the upper back of the passenger is placed to be sunk into the seat back 12 to the position shown by the one-dot chain line Q before the rear collision. Further, because the upper back of the passenger moves from this position toward the seat back front side when the rear collision occurs, the position of the one-dot chain line Q can be thought to be the rising position in the acceleration that is applied to the upper back of the passenger. However, in the case of the present exemplary embodiment, the fixed position of the upper back spring main body 54 to the side frames 26 is set to be offset further toward the seat back rear side than the fixed position of the lower back spring main bodies 48. Therefore, the upper back of the passenger is placed to be sunk into the seat back 12 to the position shown by the two-dot chain line R, i.e., a deeper position (the seat back rear side) before the rear collision. Further, because the upper back of the passenger moves from this position toward the seat back front side, the position of the one-dot chain line R can be thought to be the rising position in the acceleration that is applied to the upper back of the passenger. Accordingly, the difference between the rising position in the acceleration that is applied to the upper back of the passenger and that of the head of the passenger is reduced (in other words, the distance between the head of the passenger and the upper back of the passenger is reduced), and the load to the neck of the passenger is reduced. Generally, at the time of a rear collision, the upper back of the passenger that is pushed against the seat back starts to move toward the vehicle front side while the head of the passenger attempts to maintain the state as is due to inertia. Therefore, relative displacement between the head of the passenger and the neck of the passenger arises, and this relative displacement becomes load to the neck of the passenger.

Further, in accordance with the present exemplary embodiment, a configuration is employed that provides a difference, in the vehicle front-rear direction, between the fixed positions of the upper back spring main body 54 and the lower back spring main body 48 to the side frames 26, and therefore, the number of parts does not particularly increase.

As a result, in accordance with the vehicle seat and the seat back board relating to the present exemplary embodiment, the load to the neck of a passenger at the time of a rear collision can be reduced by a simple structure.

Figure 13A:
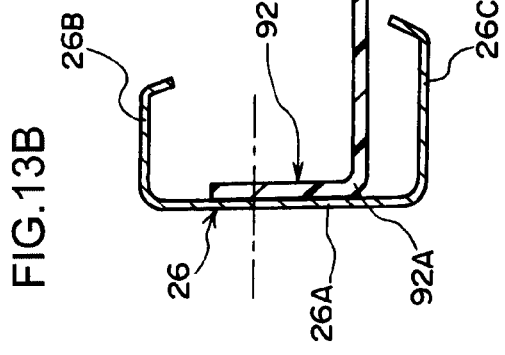
FIG. 13A through FIG. 13C are explanatory drawings for explaining effects of the fourth exemplary embodiment, where
Figure 13B:
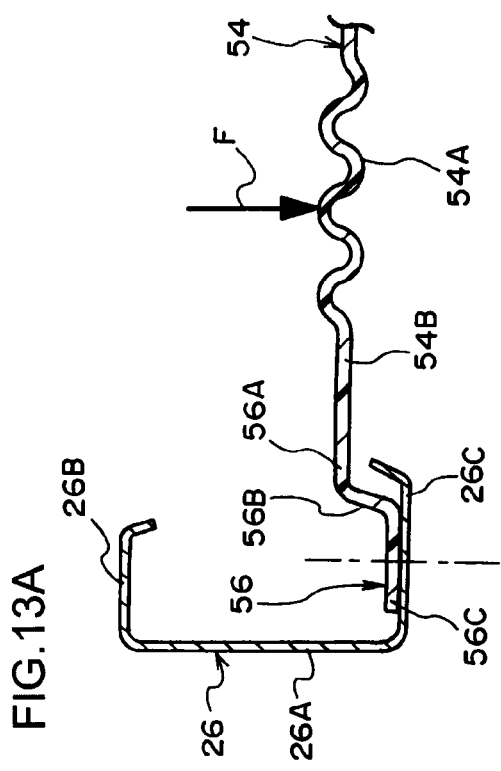
Figure 13C:
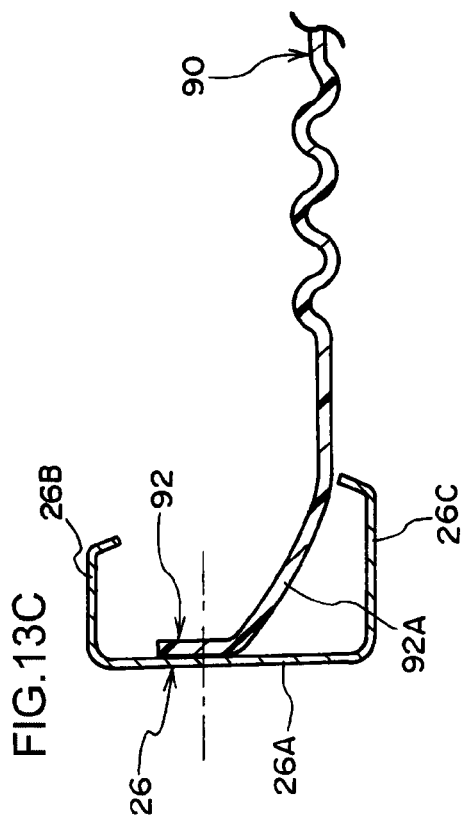

Further, in the present exemplary embodiment, as shown in FIG. 13A, the end 54B in the seat transverse direction of the upper back spring main body 54 is fixed to the rear wall 26C and not to the side wall 26A of the side frame 26, by the upper connecting/fixing portion 56. Therefore, when the load F is applied toward the seat back rear side at the time of a rear collision, any excess length is unlikely to arise at the upper back spring main body 54. Namely, supposing that, as shown in FIG. 13B, an upper connecting/fixing portion 92 that is L-shaped in planar sectional view is formed integrally with the end in the seat transverse direction of an upper back spring main body 90, and that this upper connecting/fixing portion 92 is fixed to the side wall 26A of the side frame 26, in this case, when the load F toward the seat back rear side is applied, the upper connecting/fixing portion 92 exhibits a behavior such that a corner 92A of the upper connecting/fixing portion 92 is pulled and extended obliquely toward the rear side of the vehicle. Therefore, it is predicted that the spring constant of the upper back spring main body 90 departs from the target value and that the amount of flexure increases. In contrast, in the present exemplary embodiment, the spring constant of the upper back spring main body 54 is substantially as per the target value, and the error is small. As a result, the accuracy with respect to reducing the load to the neck of the passenger at the time of a rear collision can be increased.

Moreover, in the present exemplary embodiment, the pair of lower connecting/fixing portions 50 are provided at the both ends 48B in the seat transverse direction of the lower back spring main bodies 48, and these lower connecting/fixing portions 50 are hooked on (fit-together with) the side frames 26 from the seat back front side. Therefore, at the time of sitting, the load received from the passenger is transmitted from the lower back spring main bodies 48 to the side frames 26 via the pair of lower connecting/fixing portions 50. At the time of a rear collision, because the fixed position of the upper back spring main body 54 is offset further toward the seat back rear side than the fixed positions of the lower back spring main bodies 48, the upper back of the passenger sinks into the seat back 12. As a result, in accordance with the present exemplary embodiment, the load received from the passenger at the time of sitting can be efficiently transmitted to the side frames 26, and the load to the neck of the passenger at the time of a rear collision can be effectively reduced.

Moreover, the plural lower back spring main bodies 48 are provided in the seat back height direction, and the majority of the load that is applied when the passenger sits is received while being dispersed at these lower back spring main bodies 48. Accordingly, the burden of the load on each of the lower back spring main bodies 48 is reduced. Further, because the plural lower back spring main bodies 48 support the waist of the passenger, the cushioning ability at the time of sitting is improved. Accordingly, the durability of the lower back spring main bodies 48 is improved, and the cushioning ability at the time of sitting is improved such that fatigue of the passenger can be reduced.

Moreover, the back board portion 36 that is formed by a resin plate is disposed at the back side of the seat back frame 14. Because the lower back spring main bodies 48 are provided integrally with this back board portion 36 via the pair of lower connecting/fixing portions 50, the back board portion 36 can be used as a limiting component that limits the amount of flexure of the lower back spring main bodies 48. Moreover, when the upper body of the passenger abuts the back board portion 36 via the lower back spring section, that load can be received by the back board portion 36 as well. Namely, the load transmission path from the waist of the passenger can be made to be plural paths that are a path that transmits load from the lower back spring main bodies 46 to the side frames 26 via the pair of lower connecting/fixing portions 50, and a path that transmits load from the back board portion 36 to the side frames 26 via the pair of lower connecting/fixing portions 50. Accordingly, excessive load being applied to the lower back spring main bodies 48 that are made of resin can be suppressed or prevented, and load from the passenger can be supported using the entire seat back board 16.

In the above-described exemplary embodiments, the back spring section 38 that is made of resin is formed integrally with the back board portion 36 that is made of resin, but embodiments are not limited to the same. The back spring section that is formed of resin may be provided integrally with the back board portion that is made of resin. Namely, the back board portion and the back spring section may be fabricated separately, and thereafter, the both may be integrated by welding or the like. Moreover, the back spring main bodies and the connecting/fixing portions that structure the back spring section may be fabricated as separate parts, and thereafter, may be integrated by welding or the like.

Further, in the above-described exemplary embodiments, the lower connecting/fixing portions 50 are described as elements of the lower back spring section 44 (back spring section 38). However, embodiments are not limited to this and the lower connecting/fixing portions 50 may be regarded as being elements of the back board portion 36. In the seat back board that has been assembled as a completed product, it is merely a design matter as to whether the connecting/fixing portions are regarded as being elements included in the back spring section or in the back board portion.

Further, in the fourth exemplary embodiment, the both ends 54B in the seat transverse direction of the upper back spring main body 54 are fixed to the rear walls 26C of the side frames 26 using the pair of upper connecting/fixing portions 56 that are formed in step shapes in planar sectional view. However, embodiments are not limited to the same, and various shapes can be employed. For example, if the positions, in the vehicle front-rear direction, of the rear walls 26C of the side frames 26 and the upper back spring main body 54 are not offset, the both ends 54B in the seat transverse direction of the upper back spring main body 54 may be extended as is toward the outer sides in the seat transverse direction and fixed to the rear walls 26C of the side frames 26.

The invention claimed is:

1. A vehicle seat comprising:
a seat back frame that comprises a pair of side frames, and that forms a skeleton member of a seat back;
a back board portion that is formed by a resin plate, and that is disposed at a back side of the seat back frame; and
a back spring section comprising spring main bodies that are disposed at a distance toward a vehicle front side from the back board portion and that flexurally deform, wherein the back spring section (i) is at least partially formed of resin, (ii) is integrally formed with the back board portion so that the back spring section and the back board portion form a single continuous structure, (iii) spans between the pair of side frames and is directly supported by the pair of side frames, and (iv) is formed so as to be able to flexurally deform in a load application direction due to load toward a seat back rear side being applied,
wherein the flexural deformation of the back spring section toward the seat back rear side is limited by the back board portion, and
wherein the back spring section is configured to have higher elasticity than the back board portion.

2. The vehicle seat of claim 1, wherein the back spring section is supported at the side frames via abutting surfaces that planarly contact the pair of side frames and receive load.

3. The vehicle seat of claim 1, wherein the back spring section is fitted at a seat back front side, onto front portions of the pair of side frames.

4. The vehicle seat of claim 1, wherein the back spring section comprises:
connecting/fixing portions that connect both ends in a seat transverse direction of the spring main bodies and the back board portion and that are fixed to the side frames.

5. The vehicle seat of claim 4, wherein the spring main bodies comprise lower back spring main bodies that are disposed at a lower portion of the back board portion and are arranged plurally in a seat back height direction, and an upper back spring main body that is disposed at an upper portion of the back board portion, and both ends in the seat transverse direction of the lower back spring main bodies that are plurally provided are connected in the seat back height direction by a pair of the connecting/fixing portions.

6. The vehicle seat of claim 4, wherein the pair of side frames are made to be open cross-sectional shapes at which inner sides, that oppose one another in the seat transverse direction, are open, and
wherein both ends in the seat transverse direction of the spring main bodies are configured to enter inside cross-sections of the pair of side frames.

7. The vehicle seat of claim 4, wherein the spring main bodies comprise springs made of resin.

8. The vehicle seat of claim 4, wherein the spring main bodies comprise springs made of cloth that flexurally deform in the load application direction by extending at a time of application of load toward the seat back rear side.

9. The vehicle seat of claim 1, further comprising a limiting component, that comprises a wall that limits an amount of flexure of the back spring section in the load application direction, the limiting component being disposed at a seat back rear side of the back spring section.

10. The vehicle seat of claim 9, wherein the limiting component is the back board portion.

11. The vehicle seat of claim 10, wherein the wall of the limiting component is a bottom wall of a concave portion that is provided at a seat transverse direction central portion of the back board portion and is concave toward the back spring section.

12. The vehicle seat of claim 9, wherein the limiting component is disposed at a seat back rear side of the spring main bodies.

13. The vehicle seat of claim 1, further comprising:
a seat back pad that is disposed at a front surface side of the back spring section; and
a cover that covers a surface of the seat back pad,
wherein the back spring section comprises a plurality of back spring main bodies that are disposed along a seat transverse direction between the pair of side frames, and are arranged plurally in a seat back height direction,
wherein the plurality of back spring main bodies comprises an upper back spring main body that is configured to support an upper back of a passenger, and a lower back spring main body that is configured to support a waist of the passenger, and
wherein the upper back spring main body is fixed to the pair of side frames at positions further offset toward a vehicle rear side from positions where the lower back spring main body is fixed to the pair of side frames.

14. The vehicle seat of claim 13, wherein both ends in the seat transverse direction of the upper back spring main body are supported at rear portions of the pair of side frames, and
both ends in the seat transverse direction of the lower back spring main body are supported at front portions of the pair of side frames.

15. The vehicle seat of claim 13, wherein each of the side frames comprises a side portion that extends in a seat longitudinal direction in planar sectional view and includes a front portion of the side frame, and a rear flange portion that is bent toward a seat transverse direction inner side from a rear end of the side portion and includes a rear portion of the side frame, and
wherein the ends in the seat transverse direction of the upper back spring main body are fixed to the rear flange portions via upper fixing portions.

16. The vehicle seat of claim 13, further comprising a pair of lower fixing portions, that are disposed at a seat back front side of the side frames and are fixed to the side frames, the pair of lower fixing portions being integral with the both ends in the seat transverse direction of the lower back spring main body,
wherein the lower back spring main body is formed of resin.

17. The vehicle seat of claim 16, wherein a plurality of the lower back spring main bodies are provided in the seat back height direction, and
wherein both ends in a seat transverse direction of the plurality of lower back spring main bodies are connected in the seat back height direction by the pair of lower fixing portions.

* * * * *